United States Patent
Starkey et al.

(10) Patent No.: US 6,400,261 B1
(45) Date of Patent: Jun. 4, 2002

(54) METHOD OF MONITORING A TIRE CONDITION USING A DRIVE OVER READER

(75) Inventors: Gene Raymond Starkey, Niwot; Richard Stephen Pollack, Boulder; Joseph Michael Letkomiller, Thornton, all of CO (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/821,534

(22) Filed: Mar. 29, 2001

(51) Int. Cl.[7] .............................................. B60C 23/00
(52) U.S. Cl. ....................... 340/442; 340/447; 340/445; 73/146.2
(58) Field of Search ................................. 340/442, 445, 340/446, 447, 539, 438; 73/146.2, 146.8; 116/34 R

(56) References Cited

U.S. PATENT DOCUMENTS

| | | |
|---|---|---|
| 3,752,960 A | 8/1973 | Walton |
| 4,067,235 A | 1/1978 | Markland et al. |
| 4,630,044 A | 12/1986 | Polzer |
| 5,070,334 A | 12/1991 | Commissaire et al. |
| 5,463,374 A * | 10/1995 | Mendez et al. ............. 340/442 |
| 5,500,637 A * | 3/1996 | Kokubu ...................... 340/447 |
| 5,712,609 A | 1/1998 | Mehregany et al. |
| 6,169,480 B1 * | 1/2001 | Uhl ............................ 340/442 |

FOREIGN PATENT DOCUMENTS

WO　　WO90/12474　　10/1990

OTHER PUBLICATIONS

Patent Application filed on concurrent date. Docket No. DN2000–037USA Title: A System of Apparatus for Monitoring a Tire Condition Value in a Pneumatic Tire Inventors: Starkey et al.

* cited by examiner

*Primary Examiner*—Anh La
(74) *Attorney, Agent, or Firm*—Howard M. Cohn

(57) ABSTRACT

A method of monitoring at least one tire condition value of each of a plurality of tires of a moving vehicle, with a monitoring system. Each of the tires has an electronic tire tag for sensing the tire condition value of the associated tire. The monitoring system has vehicle sensing apparatus, ramp apparatus, tire sensing apparatus, transceiver apparatus and computer apparatus removably electrically connected thereto and to the vehicle sensing apparatus and tire sensing apparatus. The method comprises the steps of determining whether the vehicle sensing apparatus has sensed the moving vehicle on the ramp apparatus supporting the moving vehicle. In addition the method includes the steps of determining whether respective tires of the moving vehicle have been sensed by the tire sensing apparatus, and transmitting an interrogation signal when the tire sensing apparatus senses at least one tire. Further, the method includes the step of receiving and demodulating modulated tire tag signals independently of one another from different tire tags for providing different demodulated tire tag signals. Moreover, the method includes the step of digitizing the different demodulated tire tag signals and providing corresponding different digital tire tag signals to the computer apparatus.

18 Claims, 9 Drawing Sheets

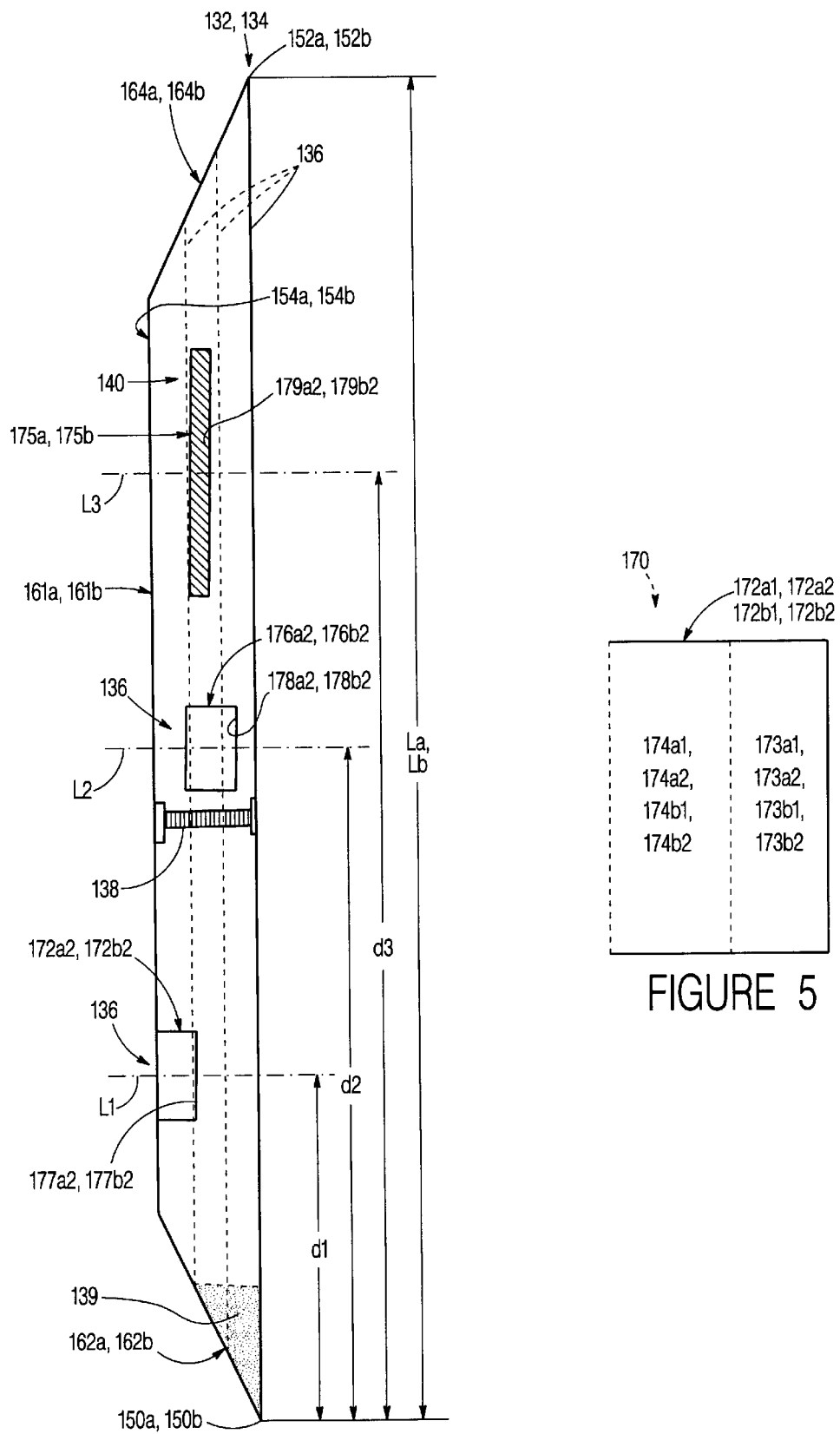

METHOD OF MONITORING A TIRE CONDITION USING A DRIVE OVER READER

TECHNICAL FIELD

This invention is generally concerned with a method of monitoring a tire-condition value in a pneumatic tire and more particularly with a method of automatically monitoring a tire-condition value in a pneumatic tire of a moving vehicle.

CROSS REFERENCE TO RELATED APPLICATIONS

This application is related to concurrently filed application entitled A SYSTEM OF APPARATUS FOR MONITORING A TIRE CONDITION VALUE IN A PNEUMATIC TIRE Ser. No. 09/820,440.

BACKGROUND OF THE INVENTION

It is known in the art to combine a passive radio frequency (RF) transponder, having a RF antenna, with a tire-condition sensor and to incorporate the resulting electronic tag with a pneumatic tire. The transponder typically includes an integrated circuit that is preferably a suitable complimentary, metal-oxide, semiconductor (CMOS). The integrated circuit generally includes a logic circuit and a read only memory (ROM) circuit connected thereto. The ROM circuit preferably has stored therein a unique serial number (SN) for identifying the electronic tire tag and thus the tire with which it is incorporated. In addition, the integrated circuit typically includes an analog to digital (A/D) converter circuit that is connected between the logic circuit and the sensor, for receiving and converting respective analog sample signals received from the sensor to respective related digital signals for processing by the logic circuit. Moreover, the integrated circuit typically includes an RF rectifier circuit that is connected between the RF antenna and the logic circuit, for receiving therefrom and rectifying an RF signal, transmitted from an external transceiver, for providing a direct current (D.C.) power input signal to the logic circuit. Still further, the integrated circuit includes a clock signal generating circuit that is also connected between the RF antenna and the logic circuit for receiving the RF signal and generating therefrom a suitable timing signal for use by the logic circuit. Moreover, the logic circuit includes a transmitter circuit. And, the logic circuit is constructed and arranged to respond to receiving the D.C power input signal for energizing the ROM circuit, the A/D converter circuit and the sensor, and for causing the transmitter circuit to transmit to of the external transceiver, data corresponding to the SN and to the then current sample signal received from the sensor.

The above-described electronic tire tag is typically incorporated with a pneumatic tire by initially encapsulating the tag in a rigid or semi-rigid material, such as a urethane, epoxy or polystyrene resin, hard rubber compound or the like. Thereafter, the encapsulated tag is normally wrapped with a green rubber material to form a patch that is fixedly secured to a previously cured pneumatic tire. Alternatively, the encapsulated tag may be included between respective layers of green-rubber material forming an uncured tire and vulcanized therewith, to form a cured pneumatic tire having the encapsulated electronic tire tag embedded therein.

As shown in U.S. Pat. No. 5,712,609, issued Jan. 27, 1998 to Mehregany et al., it is also known in the art to provide a micro-mechanical temperature condition sensor, fabricated on a silicon or bimetallic substrate, that is constructed and arranged for sensing a threshold temperature value. As discussed in the '609 Patent, when an extreme temperature condition eventuates and is sensed by a micro-mechanical temperature sensor, the sensor latches and remains latched to provide a memory of the event available for detection purposes. Due to such characteristics, the micro-mechanical temperature sensor has come to be known in the art as a maximum temperature memory switch (MTMS). Assuming the provision of an MTMS as the sensor in the electronic tire tag discussed above, the A/D converter may be eliminated since the MTMS is a digital device. Moreover, the logic circuit would then be constructed an arranged to respond to energization thereof for performing a continuity detection test of the MTMS to determine the latched or unlatched state of the MTMS and to cause the transmitter circuit to transmit, to the external transceiver, data corresponding to the SN, followed by data corresponding the latched or unlatched state of the MTMS.

As shown in U.S. Pat. No. 4,067,235, issued Jan. 10, 1978 to Markland et al., it is also known in the art to provide a system for remotely measuring the air pressure in a pneumatic tire. The system calls for the provision of an electronic tire tag that includes a passive transponder and a pressure sensor in a pneumatic tire. In addition, externally of the tire the system includes a stationary power transmitter that generates an electromagnetic field in the roadway with a flat coil antenna for empowering the transponder and pressure sensor. Moreover, the system includes a signal processor. When the pressure sensor is empowered, the sensor transmits a low frequency FM signal representative of the tire pressure to the signal processor. Whereupon the signal processor generates quantitative signals representing the pressure in the tire, and visually displays and passes such signals to a computer. By means of various flat coil antenna configurations, the system can distinguish between tires mounted in various relationships. Moreover, by coding the FM signal the system can uniquely identify the vehicle as well as each tire thereof. In an additional embodiment, a current induced therein by an external magnetic field powers the pressure sensor. This embodiment calls for the pressure sensor in the tire to be rotated through a stationary magnetic field generated by permanent magnets attached to the vehicle.

Moreover, as shown in International Patent Application Publication Number WO90/12474, published Oct. 18, 1990, it is known in the art to provide system for electronically identifying a vehicle tire having a coil and signal generator internally secured to the tire. As the vehicle and thus the tire moves in a predetermined path of travel, the signal generator in the tire responds to the presence of predetermined signals at the coil, that are received from an interrogator antenna oriented at an angle of substantially 45 degrees relative to the path of travel of the vehicle, by transmitting a unique signal identifying the signal generator.

Other publications of interest found in the course of a prior art search, concerning the subject matter of the present invention, are U.S. Pat. Nos. 3,752,960 and 4,630,044 and 5,070,334.

BRIEF DESCRIPTION OF THE INVENTION

According to the invention there is provided a method of monitoring at least one tire condition value of each of a plurality of tires of a moving vehicle, in a system of apparatus for monitoring the at least one tire condition value of each of the tires. Each of the tires has associated therewith an electronic tire tag for sensing the at least one tire condition value of the associated tire, and the monitoring system has portable vehicle sensing apparatus and portable ramp apparatus, tire sensing apparatus, portable transceiver apparatus and has portable computer apparatus removably electrically connected thereto and to the vehicle sensing apparatus and tire sensing apparatus. The method comprises the steps of the computer apparatus determining whether the vehicle sensing apparatus has sensed the moving vehicle and the ramp apparatus supporting the moving vehicle. In addition the method includes the steps of the computer apparatus determining whether respective tires of the moving vehicle have been sensed by the tire sensing apparatus, and causing the transceiver apparatus to transmit an interrogation signal when the tire sensing apparatus senses at least one tire. Further, the method includes the step of the transceiver apparatus receiving and demodulating modulated tire tag signals independently of one another from different tire tags for providing different demodulated tire tag signals. Moreover, the method includes the step of the transceiver apparatus digitizing the different demodulated tire tag signals and providing corresponding different digital tire tag signals to the computer apparatus. And, the method includes the step of the computer apparatus processing the different digital tire tag signals.

The method may also include the step of the vehicle sensing apparatus providing a vehicle sensing signal to the computer apparatus when the moving vehicle is sensed, and the computer apparatus providing an enabling signal to the transceiver apparatus upon receiving the vehicle sensing signal. In addition, the method may include the step of the tire sensing apparatus providing a tire sensing signal to the computer apparatus upon sensing the at least one tire, and the computer apparatus providing a start interrogation signal to the transceiver apparatus upon receiving the tire sensing signal. further the processing step of method may include the step of obtaining from each of the digital tire tag signals data corresponding to at least one tire condition value selected from a group consisting of a tire air pressure value, a tire air temperature value, an internal tire temperature value and an MTMS status value. And the processing step of the method may include the steps of sorting and formatting the at least one tire condition value obtained from each of the digital tire tag signals. Moreover, the processing step may include the steps of sorting and displaying the at least one tire condition value obtained from each of the digital tire tag signals.

Further, assuming the computer apparatus has ambient pressure and temperature value measuring apparatus for obtaining therefrom current ambient temperature and pressure values, the method may include the step of the computer apparatus adjusting at least one of the values obtained from the digital tire tag signal in consideration of at least one of the current ambient temperature and pressure values. Furthermore, assuming each of the tire tags has a different serial number, and the processing step of the method may include the step of obtaining from the digital tire tag signals data corresponding to the different serial numbers. In addition the processing step of the method may include the step of processing data obtained from the respective digital data signals in accordance with customer requirements. Still further, the processing step may include the step of accounting for a total number and deployment of the vehicle tires. In addition, the method may include the step of the computer apparatus determining whether the moving vehicle is no longer sensed by the vehicle sensing apparatus, and the computer apparatus permitting the transceiver apparatus to continue transmitting the interrogation signal until the moving vehicle is no longer sensed. Further the processing step may include the step of generating a date and time of receiving each of the digital tire tag signals. Still further, the method may include the step of the computer apparatus determining whether a previous count of a predetermined time period has been commenced, commencing the count upon determining that the count has not been commenced, and providing a stop interrogation signal to the transceiver apparatus for causing discontinuance thereby of the interrogation signal when the count ends.

In addition, the method may include the step of the computer apparatus determining whether respective tires of the moving vehicle have been sensed by the tire sensing apparatus until the vehicle is no longer sensed. Moreover the method may include the step of the computer apparatus commencing a count of a predetermined time interval when the computer apparatus stops receiving the tire sensing signals, and causing the transceiver apparatus to continue transmission of the interrogation signal until the count ends. The method may also include the step of the computer apparatus providing a stop interrogation signal to the transceiver apparatus for causing discontinuance thereby of the interrogation signal when the count ends. Further, the method may also include the step of the computer apparatus providing a shutdown signal to the transceiver apparatus when the vehicle is no longer sensed and the transceiver apparatus executing a shutdown routine upon receiving the shutdown signal. In addition, the method may include the step of the computer apparatus determining whether another vehicle has been sensed after the computer apparatus provides the shutdown signal to the transceiver apparatus. And, the method may include the step of the computer apparatus storing data corresponding to the respective digital data signals for historical reference purposes.

BRIEF DESCRIPTION OF THE DRAWINGS

Selected parts of the drawings hereinafter described may be shown out of scale for the sake of illustrative clarity. Moreover, cross-sectional views, if any, that are included herein are focused on and limited to a view along the line of the cross-section and omit background structure that would otherwise be shown in a true cross-sectional view, again for the sake of illustrative clarity.

As shown in the following drawings, wherein like reference numerals designate like or corresponding parts throughout the several Figures:

FIG. 4 is an enlarged transverse cross-sectional view of the of the portable ramp apparatus of FIG. 3, taken substantially along either of the lines 4—4 thereof;

FIG. 5 is an enlarged schematic view of the tire pressure sensing structures of FIG. 3;

DETAILED DESCRIPTION OF THE INVENTION

Figure 1:
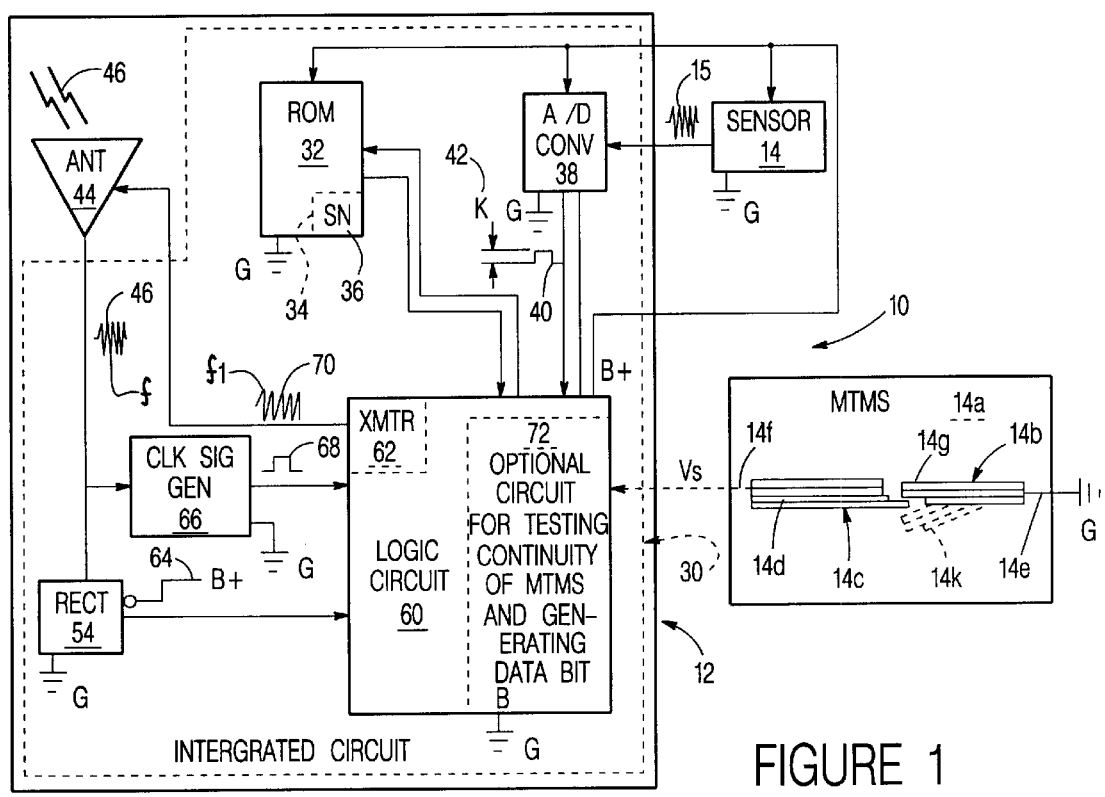
FIG. 1 is a schematic view of an electronic tire tag including at least one tire-condition value sensor.

An electronic tire tag 10 (FIG. 1) of the type that may be monitored according to the invention has an electrical ground (G), and generally comprises a passive transponder 12 and at least one conventional tire-condition sensor 14 that is suitably electrically connected to the transponder 12. The at least one tire-condition sensor 14 provides an analog tire-condition sample signal 15 corresponding to a tire-condition sample taken by the at least one tire-condition sensor 14 in response to energization thereof.

The transponder 12 (FIG. 1) includes an integrated circuit 30 that is preferably a suitable complimentary, metal-oxide, semiconductor. The integrated circuit 30 includes a read only memory (ROM) 32, which is preferably an electrically erasable, programmable, read-only memory (EEPROM). The ROM 32 includes structure 34 for storing therein a unique serial number (SN) 36 for identifying the electronic tire tag 10. The integrated circuit 30 also preferably includes a conventional analog to digital (A/D) converter circuit 38. The A/D converter circuit 38 is conventionally electrically connected to the at least one tire-condition sensor 14 for receiving therefrom and converting the analog tire-condition sample signal 15 to a corresponding digital tire-condition sample signal 40 having a magnitude value (K) 42.

Without departing from the spirit and scope to the invention, the at least one sensor 14 (FIG. 1) may be a single maximum temperature memory switch (MTMS) 14a. Assuming that the at least one sensor 14 is solely an MTMS 14a, then the A/D converter circuit 38 may be eliminated, since the MTMS 14 is a digital device. On the other hand, assuming a plurality of sensors 14, and one of the sensors 14 being an MTMS 14a, then, the A/D converter circuit 38 would be retained. Moreover, in a preferred embodiment of the invention, the at least one sensor 14 includes an air pressure sensor and the A/D converter circuit 38 is preferably retained.

Assuming the provision of the MTMS 14a (FIG. 1), the MTMS 14a includes a multi-layered, bimetallic, temperature sensing beam 14b, and includes a multi-layered, bimetallic, resetting beam 14c having a polysilicon heating resistance layer 14d. Further, the MTMS 14a has a test lead 14e extending from the temperature sensing beam 14b, and has a test lead 14f extending from the resetting beam 14c. The test lead 14e is conventionally electrically connected to ground G and the test lead 14f is conventionally electrically connected to the integrated circuit 30. The temperature sensing beam 14b has a normally open, unlatched, state or position 14g, wherein the temperature sensing beam 14b is disposed in overlapping relationship with the resetting beam 14c and the resistance of the MTMS 14a, as measured between the leads, 14e and 14f, is substantially five megohms. Moreover, the temperature sensing beam 14b has a deflected, latched, state or position 14h, wherein the resetting beam 14c is disposed in deflecting or latching engagement with the temperature sensing beam 14b, and wherein the electrical resistance of the MTMS 14a, as measured between the leads, 14e and 14f, is substantially five hundred ohms. The MTMS 14a operates to close to the latched position 14h when the MTMS 14a is exposed to a predetermined, extreme temperature value. Thus, the voltage Vs across the MTMS 14a is normally at a high value, corresponding to an open circuit, until the MTMS 14a is exposed to the predetermined extreme temperature value, whereupon the voltage Vs falls to a low value, corresponding to a closed circuit.

The transponder 12 (FIG. 1) includes an antenna (ANT) 44 that is conventionally electrically connected to the integrated circuit 30. The antenna 44 is suitably tuned to a predetermined radio frequency "f" of substantially 125 megahertz, for receiving RF signals 46, known in the art as interrogation signals 46, from an external transceiver, such as the transceiver 50 of FIG. 3. Moreover, the integrated circuit 30 (FIG. 1) includes a rectifier circuit (RECT) 54 that is suitably electrically connected to the antenna 44 for receiving the RF interrogation signal 46 therefrom.

The integrated circuit 30 (FIG. 1) also includes a logic circuit 60 having a transmitter circuit (XMTR) 62. When the transceiver 50 (FIG. 3) transmits an RF interrogation signal 46 (FIG. 1) to the transponder 12, the antenna 44 applies the RF signal 46 to the rectifier circuit 54. Whereupon the rectifier circuit 54 rectifies the received RF signal 46 for providing a direct current (D.C.) power signal (B+) 64 to the logic circuit 60. In addition, the integrated circuit 30 includes a suitable clock signal generating (CLK SIG GEN) circuit 66, such as a conventional oscillator or counting circuit, which is conventionally electrically connected to the logic circuit 60. The clock signal generating circuit 66 is also suitably electrically connected to the antenna 44 for receiving therefrom the RF interrogation signal 46 and deriving or otherwise generating therefrom a high frequency digital clock signal 68 for use by the logic circuit 60 as a timing signal.

The logic circuit 60 (FIG. 1) is conventionally electrically connected between the antenna 44 and the ROM 32 and, if the A/D converter circuit 38 is provided, between the antenna 44 and the A/D converter circuit 38. Also, assuming the provision of the A/D converter circuit 38, the energized A/D converter circuit 38 provides the digital, tire-condition, sample signal 40, having a magnitude value (K) 42, to the logic circuit 60. Moreover, the logic circuit 60 is constructed and arranged to copy the serial number 36 from the energized ROM circuit 32, and to cause the transmission, as by phase modulation, of a data modulated signal 70, having a frequency (f1) of substantially 62.5 KHz. The data modulated signal 70 includes the serial number (SN) 36 and the digital data tire-condition sample signal 42 provided to the transmitter circuit 62, and is transmitted to the external transceiver 50 (FIG. 3) when the logic circuit 60 (FIG. 1) is energized. On the other hand, if the at least one sensor 14 includes or is solely an MTMS 14a, the logic circuit 60 would then include a circuit 72, which is programmed for testing the continuity of the MTMS 14a and providing a data bit "B", either zero (0) or one (1), that is representative of the unlatched or latched state, 14g or 14h, of the MTMS 14a and thus the resistance value thereof. And, the logic circuit 60 would respond to receiving the D.C. power input signal and count signals, 64 and 68, to energize the ROM circuit 32, provide the continuity test of the MTMS 14a and generate the appropriate data bit B, indicating the latched or unlatched state thereof. Moreover, the logic circuit 60 would then be constructed and arranged to copy the serial number (SN) 36 from the energized ROM circuit 32 and to cause the transmission of the data modulated signal 70, including the serial number (SN) 36 and the data bit B representative of the unlatched or latched state, 14g or 14h, of the MTMS 14a. Of course, if both the MTMS 14a and another sensor 14 are provided, the transmitted data modulated signal 70 would include data corresponding to the serial number (SN) 36, the data bit B and the digital tire condition sample signal value 40.

Figure 2:
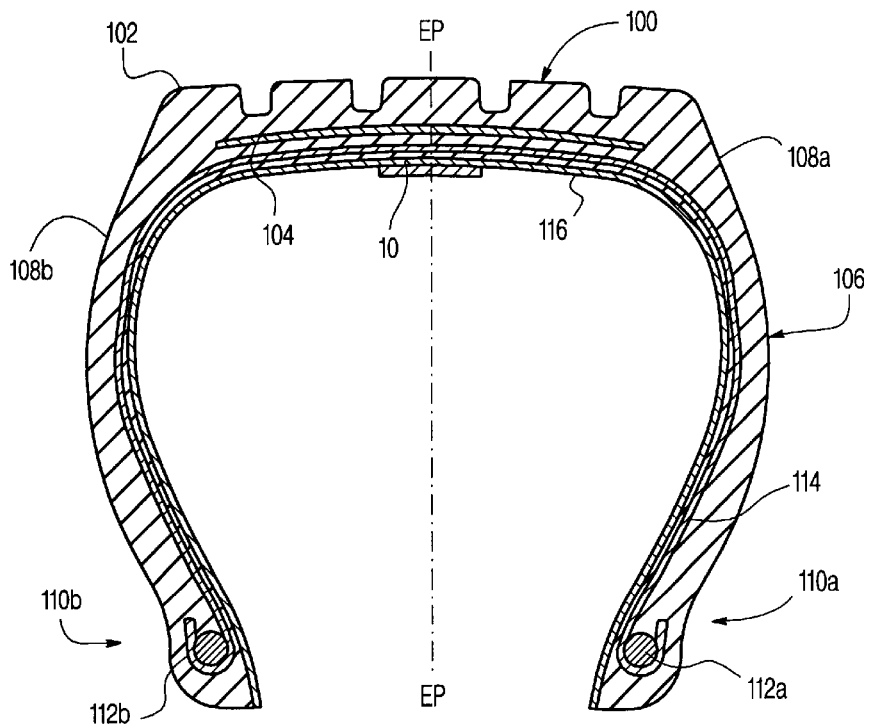
FIG. 2 is a schematic, transverse cross-sectional view of a pneumatic tire having a central tread and an innerliner, and showing the electronic tire tag of FIG. 1 incorporated with the tire by fixedly securing the tag to the innerliner thereof along the equatorial plane of the tire.

The electronic tire tag 10 (FIG. 1) is conventionally encapsulated in a rigid or semi-rigid material, such as a urethane, epoxy or polystyrene resin, hard rubber compound or the like (not shown). Thereafter, the encapsulated electronic tire tag 10 is preferably wrapped with a suitable green rubber material (not shown) to form a green rubber patch (not shown) that is vulcanized and fixedly secured to a cured pneumatic tire 100 (FIG. 2). However, without departing from the spirit and scope of the invention, the encapsulated tire tag 10 may be wrapped in the green rubber material (not shown) forming the tire for vulcanization therewith to form a cured, pneumatic tire 100 having embedded therein the encapsulated tire tag 10. In either instance the electronic tire tag 10 is incorporated or otherwise associated with the tire 100 to permit the tire condition sensor 14 to sense the relevant tire condition, that is, the air temperature within the tire, the temperature internally of the tire 100, a threshold temperature internally of the tire or the inflation pressure within the tire 100.

A typical pneumatic tire 100 (FIG. 2), with which the electronic tire tag 10 is incorporated or otherwise associated, comprises a central tread 102 having oppositely spaced sides, generally indicated by the numerals, 104a and 104b. The tire 100 has an imaginary plane, known in the art as an equatorial plane (EP), that extends perpendicular to the axis of rotation of the tire 100 and passes through the center of the tread 102. Under ideal circumstances, the oppositely spaced parts of the tire 100 discussed herein are equidistantly oppositely spaced from the EP of the tire 100. The tire 100 also includes a plurality of radially extending belts, exemplified by the belt 106, that are centrally disposed radially-inwardly of the tread 102. In addition, the tire 100 includes a carcass 106. The carcass 106 has oppositely spaced sidewalls 108a and 108b. The sidewall 108a merges with and radially-extends inwardly from the tread side 104a and the sidewall 108b merges with and radially extends inwardly from the sidewall 108b. The carcass 106 also includes oppositely spaced bead portions, 110a and 110b, at the oppositely spaced, radial inner ends thereof. The bead portion 110a includes an annularly shaped bead 112a, and the bead portion 110b includes an annularly shaped bead 112b. Thus, the carcass 106 includes oppositely spaced bead portions, 112a and 112b. Moreover, the carcass 106 includes a ply 114, and is radially disposed inwardly of the belt 106. The ply 114 radially extends between and is looped about each of the opposite beads 112a and 112b. Furthermore, the carcass 106 includes an innerliner 116 that extends between the bead portions, 110a and 110b, and is radially disposed inwardly of the ply 114. Preferably, the electronic tire tag 10 (FIG. 1) is incorporated with the tire 100 (FIG. 2) by fixedly securing the electronic tire tag 10 to the innerliner 116 of the tire 10 along the equatorial plane EP thereof.

According to the invention there is provided a system 125 (FIG. 3) of apparatus for monitoring a tire-condition value in a pneumatic tire 100, and, more particularly, for automatically monitoring a tire condition value in each of the pneumatic tires 100 (FIG. 2) of a moving vehicle 128.

The monitoring system 125 (FIG. 3) generally includes portable vehicle sensing apparatus 130, for sensing the presence of a moving vehicle 128 having a front end 128f, a rear end 128r and an overall length L. The vehicle sensing apparatus 130 preferably includes any commercially available device 130A, such as an infrared switch that is conventionally electrically connected to the PC 300 hereinafter described for providing a signal 130B thereto that is representative of the presence of the moving vehicle 128.

In addition, the monitoring system 125 (FIG. 3) preferably includes portable ramp apparatus 131. Preferably, the sensing apparatus 130 is located forwardly of the ramp apparatus 131. Upon sensing the front end 128f of a moving vehicle 128, the sensing apparatus 130 provides a signal, such as the signal 130B, to the PC 300, thereby indicating the presence of a moving vehicle 128 and thus the approach thereof to the ramp apparatus 131. In addition, when the rear end 128r of the moving vehicle 128 passes the sensing apparatus 130, the sensing apparatus 130 detects the absence of the signal 130B and discontinues the signal 130B to the PC 300, thereby indicating the departure of the moving vehicle 128. And the ramp apparatus 131 supports the moving vehicle as the vehicle 128 moves thereover while the electronic tire tags 10 (FIG. 2) of the respective tires 100, located at intervals along the overall length L of the vehicle 128, are individually monitored by the monitoring system 125.

In order to promote portability thereof, the ramp apparatus 131 (FIG. 3) includes at least one and preferably a plurality of generally rectangularly shaped, portable, ramp structures for supporting the moving vehicle 128. Thus the ramp apparatus 131 preferably includes a first, or left, ramp structure 132, for supporting the left side 133a of a moving vehicle 128, and a second, or right, ramp structure 134, for supporting the right side 133b of a moving vehicle 128, as the vehicle 128 rolls over the ramp apparatus 131. Since numerous parts of the left and right ramp structures, 132 and 134, and the structures embedded therein and associated therewith, correspond in all respects to one another, the numerical designations of the parts of the left ramp structure 132, and the structures embedded therein and associated therewith, will be followed by the letter "a" and the corresponding parts of the right ramp structure 134 and structures embedded therein and associated therewith, will bear the same numerical designation as they do when embedded therein or associated with the left ramp structure 132 but be followed by the letter "b".

The left and right ramp structures, 132 and 134 (FIG. 3), may each be fabricated from a plurality of sheets of marine plywood 136 that are held together by means of conventional fasteners 138, one of which is shown for illustrative purposes. However, each of the ramp structures, 132 and 134, is preferably fabricated from laminations of a green rubber material and conventionally vulcanized to a form portable, cured, hard rubber, mat 139. In either mode of fabrication the left and right ramp structures, 132 and 134, are also constructed, arranged and dimensioned as hereinafter discussed.

The left and right ramp structures, 132 and 134 (FIGS. 3 and 4), respectively, have a laterally extending front end, 150a or 150b, a laterally extending rear end, 152a or 152b, and an upper surface, 154a or 154b, extending therebetween. Further, the respective upper surfaces, 154a and 154b, have corresponding horizontally extending overall lengths of La and Lb, respectively.

A typical vehicle 128 (FIG. 3) is driven on and off of the ramp structures, 132 and 134, along a path of travel 165 that extends substantially perpendicular to the laterally-extending ramp front ends, 150a and 150b, at a speed of substantially five miles per hour. To accommodate rolling the respective vehicle tires 100, exemplified by the tires, 100a1, 100a2, 100b1 and 100b2, on and off the ramp apparatus 131, the left and right ramp structures, 132 and 134, respectively include a mid-portion, 161a or 161b, a front end portion, 162a or 162b and a rear end portion, 164a or 164b. Moreover, the front end portions, 162a and 162b, are respectively dimensioned for causing the upper ramp surfaces, 154a and 154b, to be inclined upwardly and rearwardly from their respectively associated ramp front ends, 150a and 150b, to their respectively associated ramp mid-portions, 161a and 161b, to accommodate upwardly rolling the tires, 100a1 and 100a2, and 100b1 and 100b2, of the left and right sides 133a of a vehicle 128, respectively, on to the respective ramp front ends, 150a and 150b, and therefrom, on to the respective ramp mid-portions, 161a and 161b. Moreover, the rear end portions, 164a and 164b, are respectively dimensioned for causing the upper ramp surfaces, 154a and 154b, to be inclined downwardly and rearwardly from the respectively associated ramp mid-portions, 161a and 161b, to accommodate downwardly rolling the tires, 100a1 and 100a2, and 100b1 and 100b2, of the left and right sides, 133a and 133b, of a vehicle 128, respectively, from the ramp mid-portions, 161a and 161b, and therefrom, off the respectively associated ramp rear ends, 152a and 152b.

Without departing from the spirit and scope of the invention, whether made of wood or vulcanized rubber, the respective ramp front end portions, 162a and 162b (FIGS. 3 and 4), and ramp rear end portions, 164a and 164b, may have flat, rather than inclined, upper surfaces, 154a and 154b, and the respective ramp structures, 132 and 134, may be removably embedded in concrete C.

The monitoring system 125 (FIG. 3) also generally includes tire sensing apparatus 170. The tire sensing apparatus 170 includes at least one and preferably a plurality of left tire pressure sensing structures, 172a1 and 172a2, embedded in the left ramp structure 132, for respectively independently sensing individual or tandemly mounted, tires, 100a1 or 100a, or 100a1 and 100a2, of the left side 133a of a moving vehicle 128. Moreover, the tire sensing apparatus 170 (FIG. 5) includes at least one and preferably a plurality of right tire pressure sensing structures, 172b1 and 172b2, that are embedded in the right ramp structure 134, for respectively independently sensing individual or tandemly mounted tires, 100b1 or 100b2, or 100b1 and 100b2, of the right side 133b of a moving vehicle 128. In connection with the foregoing notion of sensing the individual left and right tires, 100a1 or 100a, and 100b1 or 100b2, it is noted that the individual left and right front tires, 100a1 or 100a2, and 100b1 or 100b2, as the case may be, of the tractor of a given vehicle 128, may be aligned either with the left and right, outside, tandemly mounted tires, 100a1 and 100b2, of the trailer of the vehicle 128, or with the left and right, inside, tandemly mounted tires, 100a2 and 100b1, of the trailer of the vehicle 128.

Each of the tire pressure sensing structures, 172a1, 172a2, 172b1 and 172b2 (FIGS. 3 and 5), preferably includes a commercially available, single pole, double throw, pressure sensitive, switch, 173a1 and 173a2, 173b1 or 173b2. In addition, each of the tire pressure sensing structures, 172a, 172a2, 172b1 and 172b2, preferably includes a commercially available, resilient, polyurethane, potting material, 174a1, 172a2, 174b1 and 174b3, for potting the respective switches 137a1 and 137a2, 137b1 and 137b2. As thus constructed and arranged, when the respective tires 100a1, 100a2, 100b3 or 100b4 of a moving a vehicle 128 roll on to a respectively associated tire pressure sensing structure, 172a1, 172a2, 172b1 or 172b2, the resilient material, 174a1, 172a2, 174b1 or 174b3, thereof, as the case may be, is compressed and a portion of the resulting resilient energy stored therein is released to actuate the associated switch 173a1, 173a2, 173b1 or 173b2, for respectively providing signals, represented by the signals, 173A1, 173A2, 173B1 or 173B2, as the case may be, to the PC 300 hereinafter described. Thereafter, when the moving vehicle tire, 100a1, 100a2, 100b3 or 100b4, rolls off the respectively associated tire pressure sensing structure, 172a1, 172a2, 172b1 or 172b2, the resilient material, 174a1, 172a2, 174b1 or 174b3, thereof, as the case may be, is decompressed and the remainder of the resilient energy stored therein is released to deactuate the associated switch, 173a1, 173a2, 173b1 or 173b2, as the case may be, resulting in discontinuance of the respective signals, 173A1, 173A2, 173B1 or 173B2, as the case may be. Accordingly, upon actuation or de-actuation of the respective switches, 173a1, 173a2, 173b1 or 173b2, the associated tire pressure sensing structures, 172a1, 172a2, 172b1 or 172b2, as the case may be, respectively provide signals, represented by the signals, 173A1, 173A2, 173B1 and 173B2, to the PC 300 that are indicative of either the presence or absence of a vehicle tire, 100a1 100a2, 100b1 or 100b2, as the case may be, on the associated tire pressure sensing structure, 172a1, 172a2, 172b1 or 172b2.

Further, the monitoring system 125 (FIG. 3) generally includes the transceiver apparatus 50. The transceiver apparatus 50 generally comprises at least one and preferably a plurality of transmitting antennas structures 175, that are respectively operable for transmitting interrogation signals 46, at a frequency of substantially 125 KHz, to the tire tags 10 of a moving vehicle 128, for energization thereof. Preferably, the plurality of transmitting antenna structures 175 include left and right transmitting antennas, 175a and 175b. The left transmitting antenna 175a is preferably embedded in the left ramp structure 132 for providing an interrogation signal 46 for independently energizing the electronic tire tags 10 of left, individual or tandemly mounted, tires, 100a1 or 100a2, or 100a1 and 100a2, of the left side 133a of a moving vehicle 128. And, the right transmitting antenna 175b is preferably embedded in the right ramp structure 134 for providing an interrogation signal 46 for independently energizing the electronic tire tags 10 of right, individual or tandemly mounted tires, 100b1 or 100b2, of the right side 133b of a moving vehicle 128. Preferably, each of the transmitting antennas, 175a and 175b, comprise 25 turns of a 28 gauge silver plated ribbon cable that is suitably wound on a 37 inch, elongate, square, Type 78, ferrite rod including nine ferrite rods that are respectively 4.1 inches in length and conventionally cemented together. In addition, the respective transmitter antennas, 175a and 175b, are preferably tuned to a frequency of substantially 125 KHz.

Further, the transceiver apparatus 50 generally comprises at least one and preferably a plurality of receiving s structures 176 embedded in the ramp apparatus 131, that are respectively operable for receiving data modulated tire condition signals 70, at a frequency of substantially 62.5 KHz, from respective tire tags 10. Moreover, the receiver antenna structures 176 preferably comprise at least one and preferably plurality of left receiver antenna structures 176 embedded in the left ramp structure 132, including receiver antennas, 176a1 and 176a2, for respectively receiving data modulated tire condition signals 70 independently of one another from the electronic tire tags 10 of the left, individual or tandemly mounted, tires, 100a1 or 100a2, or 100a1 and 100a2, of the left side 133a of a moving vehicle 128. In addition, the receiver antenna structures 176 preferably comprise at least one and preferably plurality of right receiving antenna structures 176 embedded in the right ramp structure 134, including receiver antennas, 176b1 and 176b2, for respectively receiving data modulated tire condition signals 70 independently of one another from the electronic tire tags 10 of the right, individual or tandemly mounted, tires, 100b1 or 100b2, or 100b1 and 100b2, of the right side 133b of a moving vehicle 128. Preferably, each of the receiver antennas, 176a1, 176a2, 176b1 and 176b2, comprises 325 turns of a 36 gauge insulated wire that is suitably wound on an elongate, Type 33, ferrite rod that is preferably one-half an inch in diameter and 13 inches in length. In addition, the respective receiver antennas, 176a1, 176a2, 176b1 and 176b2, are preferably tuned to a frequency of substantially 62.5 KHz.

For embedding therein the tire pressure sensing structures, 172a1 and 172a2 (FIGS. 3 and 4), for independently sensing the presence on the ramp structure 132 of each of the left, individual or tandemly mounted, tires, 100a1 or 100a2, or 100a1 and 100a2, the left ramp structure 132 includes a pair of generally rectangularly-shaped cavities, 177a1 and 177a2, formed downwardly thereinto from the ramp upper surface 154a. The respective cavities, 177a1 and 177a2, have imaginary centerlines, "CLa1" and "CLa2", that are horizontally spaced apart from one another a distance "da" that corresponds to the distance between the equatorial planes, EPa1 and EPa2, of conventional tires, 100a1 and 100a2, that are mount ed in tandem with one another at various intervals along the overall length (not shown) of the left side 133a of a vehicle 128. Moreover, the respective cavities, 177a1 and 177a2, are horizontally aligned with along an imaginary, horizontally-extending, axis "L1" that extends substantially perpendicular to the path of travel 165 of a moving vehicle 128 and parallel to the ramp front end 150a. And, preferably, the axis L1 of the respective cavities, 177a1 and 177a2, is spaced a distance "d1" of substantially one-fourth of the ramp length La from the left, laterally-extending, left ramp structure front end 150a.

Correspondingly, for embedding therein the tire pressure sensing structures, 172b1 and 172b2 (FIGS. 3 and 4), for independently sensing the presence on the ramp structure 134 of each of the right, individual or tandemly mounted, tires, 100b1 or 100b2, or 100b1 and 100b2, the right ramp structure 134 includes a pair of generally rectangularity-shaped cavities, 177b1 and 177b2, formed downwardly thereinto from the upper surface 154b thereof. The respective cavities, 177b1 and 177b2, have imaginary centerlines, "CLb 1" and "CLb2, that are horizontally spaced apart from one another a distance "db" that corresponds to the distance between the equatorial planes, EPb1 and EPb2, of conventional tires, 100b1 and 100b2, that are mounted in tandem with one another at various intervals along the overall length (not shown) of the right side 133b of a vehicle 128. Moreover the respective cavities, 177b1 and 177b2, are axially located along the imaginary axis "L1" that extends substantially perpendicular to the path of travel 165 of the vehicle 128 and parallel to the right ramp front end 150b. And, preferably, the axis of the respective cavities, 177b1 and 177b2, is spaced a distance "d1" of substantially one-fourth of the ramp length Lb, from the right, laterally extending, ramp structure front end 150b.

Figure 3:
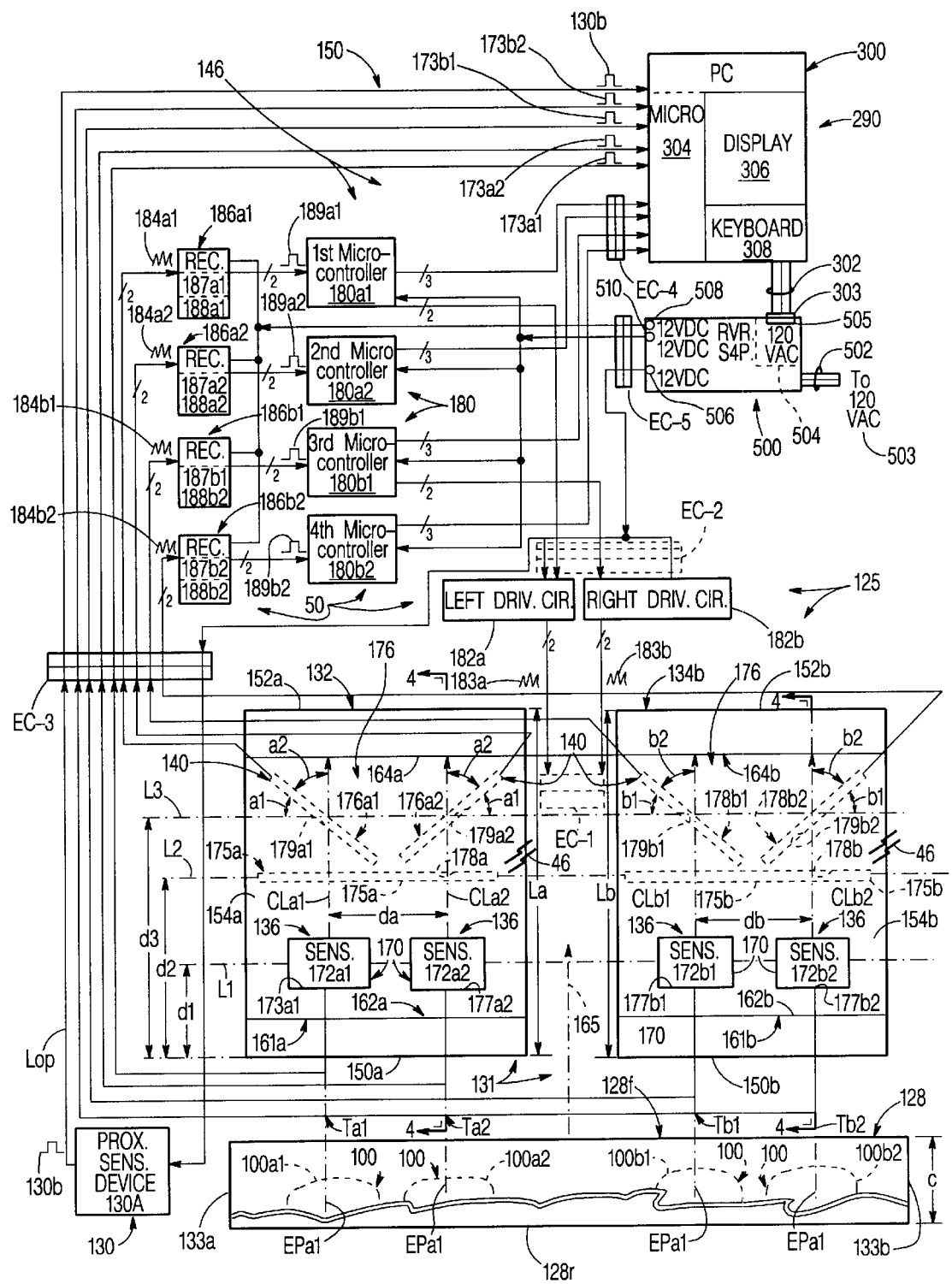
FIG. 3 is a schematic view of monitoring system according to the invention, including portable ramp apparatus including tire pressure sensing structures thereof, vehicle sensing apparatus, transceiver apparatus and computer apparatus, and electronic structures associated therewith, for monitoring at least one tire-condition value of a each of plurality of electronic tags incorporated with tires of a moving vehicle.

Moreover, as shown in FIGS. 3 and 4, for embedding therein the left transmitting antenna structures 175, and thus the transmitter antenna 175a, for providing an interrogation signal 46 for substantially concurrently energizing tire tags 10 of respective left, individual or tandemly mounted, tires, 100a1 or 100a2, or 100a1 and 100a2, of a moving vehicle 128, the left ramp structure 132 generally includes an elongate channel 178a formed internally therein. The channel 178a has an imaginary axis "L2" that extends substantially perpendicular to the path of travel 165 of a moving vehicle 128 and parallel to the left ramp front end 150a. Preferably, the axis L2 of the channel 174a is spaced a distance "d2" of substantially one-half of the left ramp length La from the laterally-extending left ramp front end 150a.

Correspondingly, as shown in FIGS. 3 and 4, for embedding therein the right transmitting antenna structures 175, and thus the right transmitter antenna 175b, for providing an interrogation signal 46 for substantially concurrently energizing tire tags 10 of respective right, individual or tandemly mounted, tires, 100b1 or 100b2, or 100b1 and 100b2, of a moving vehicle 128, the right ramp structure 134 generally includes an elongate channel 178b formed internally therein. The channel 178b has an imaginary axis "L2" that extends substantially perpendicular to the path of travel 170 of a moving vehicle 128 and parallel to the right ramp front end 150b. Preferably, the axis L2 of the channel 178b is spaced a distance "d2" of substantially one-half of the right ramp length Lb from the laterally-extending right ramp front end, 150b.

Still further, for respectively embedding therein the left receiver antenna structures 176 (FIGS. 3 and 4), and thus the left receiver antennas, 176a1 and 176a2, for independently receiving data modulated tire condition signals 70 (FIG. 2) from electronic tire tags 10 of respective left, individual or tandemly mounted, tires, 100a1 or 100a2, or 100a1 and 100a2 (FIGS. 3 and 4) of the left side 133a of a moving vehicle 128, the ramp structure 132 includes a pair of elongate generally rectangularly-shaped channels, 179a1 and 179a2, formed internally therein. The channels, 179a1 and 179a2, are substantially centrally located along an imaginary line "L3" that extends substantially perpendicular to the path of travel 165 of a moving vehicle 128 and parallel to the left ramp front end 150a. Preferably, the centers of the channels, 179a1 and 179a2, are spaced a distance "d3" of from two-thirds to three-quarters of the left ramp length La from the laterally-extending left ramp front end 150a. Moreover, each of the channels, 179a1 and 179a2, is preferably oriented at an angle "a1" of substantially 45 degrees with respect to the imaginary line L3, and thus at an angle "a2" of substantially 45 degrees with respect the paths of travel, Ta1 and Ta2, of respective vehicle tires, 100a1 and 100a2.

Correspondingly, for respectively embedding therein the right receiving antenna structures 176 (FIGS. 3 and 4), and thus the right receiver antennas, 176b1 and 176b2, for independently receiving data modulated tire condition signals 70 (FIG. 2) from the electronic tire tags 10 of respective right, individual or tandemly mounted, tires, 100b1 or 100b, or 100b1 and 100b2 (FIGS. 3 and 4), of the right side 133b of a moving vehicle 128, the right ramp structure 134 also includes a pair of elongate generally rectangularly-shaped channels, 179b1 and 179b2, formed internally therein. The channels, 179b1 and 179b2, are substantially centrally located along the imaginary line L3 that extends substantially perpendicular to the path of travel 165 of a moving vehicle 128 and parallel to the right ramp front end 150*b*. Preferably, the centers of the channels, 175*b*1 and 175*b*2, are spaced a distance "d3", of from two-thirds to three-quarters of the ramp length Lb, from the laterally-extending right ramp front end 150*b*. Moreover, each of the channels, 179*b*1 and 179*b*2, is preferably oriented at an angle "b1" of substantially 45 degrees with respect to the imaginary line L3, and thus at an angle "b2" of substantially 45 degrees with respect the paths of travel, Tb1 and Tb2, of respective vehicle tires, 100*b*1 and 100*b*2.

For timely operating the transceiver apparatus 50 (FIG. 3) the transceiver apparatus 50 also generally comprises at least one and preferably a plurality of micro-controller circuits including first, second, third and fourth micro-controller circuits respectively designated 180*a*1, 180*a*2, 180*b*1 and 180*b*2. Moreover, the transceiver apparatus 50 includes at least one and preferably plurality of transmitter antenna driver circuits including left and right transmitter antenna driver circuits, 182*a* and 182*b*, for respectively driving the left and right transmitter antennas, 175*a* and 175*b*. Each of the left and right antenna driving circuits, 182*a* and 182*b*, comprises a suitable electrical bridge-type circuit that is conventionally electrically connected to a different selected transmitter antenna, 175*a* or 175*b*, and a different selected micro-controller circuit, 180*a*1, 181*a*2, 180*b*1 or 180*b*2, for independently energizing the left and right transmitter antennas, 175*a* and 175*b*, with respective signals, represented by the signals, 183*a* and 183*b* having a frequency of substantially 125 KHz. The left driving circuit 182*a* is preferably conventionally electrically connected between the left transmitter antenna 175*a* and the first micro-controller circuit 180*a*1, whereas the right antenna driving circuit 182*b* is preferably conventionally electrically connected between the right transmitter antenna 175*b* and the third micro-controller circuit 180*b*1. Moreover, to promote portability of the transceiver apparatus 50 and ramp apparatus 131, in a preferred embodiment of the invention, the left and right antenna driver circuits, 182*a* and 182*b*, are conventionally removably electrically connected to the associated left and right transmitter antennas, 175*a* and 175*b*, as by means of a conventional electrical connector EC-1. Alternatively, in another preferred embodiment of the invention, the left antenna transmitter antenna structure 175 includes the left antenna driver circuit 182*a*, the right antenna structure 175 includes the right antenna driver circuit 182*b* and, as thus constructed and arranged, the left and right antenna structures 175 are preferably respectively conventionally removably electrically connected to the associated first and third micro-controller circuits, 180*a*1 and 180*b*1, as by means of a conventional electrical connector EC-2, which may also be utilized for removably connecting a 24 VDC power lead to the left and right driver circuits, 182*a* and 182*b*.

In addition, for independently receiving respective data modulated tire condition signals, 184*a*1 and 184*a*2, 184*b*1 and 184*b*3 (FIG. 3), respectively, from the receiver antennas, 176*a*1 and 176*a*2, and 176*b*1 and 176*b*2, the transceiver apparatus 50 generally comprises at least one and preferably a plurality of receiver circuits, and thus first, second, third and fourth receiver circuits, 186*a*1, 186*a*2, 186*b*1 and 186*b*2. Each of the receiver circuits, 186*a*1, 186*a*2, 186*b*1 and 186*b*2, includes suitable series connected, amplification and demodulation circuits 187*a*1 and 188*a*1, 187*a*1 and 188*a*2, 187*b*1 and 188*b*1, or 187*b*2 and 188*b*2, as the case may be, for respectively sequentially amplifying and then demodulating the associated data modulated tire condition signals, 184*a*1, 184*a*2, 184*b*1 and 184*b*2, received from the respective receiver antennas 176*a*1, 176*a*2, 176*b*1 and 176*b*2. Each of the receiver circuits, 186*a*1, 186*a*2, 186*b*1 and 186*b*2, is conventionally electrically connected to a different receiver antenna, 176*a*1, 176*a*2, 176*b*1 or 176*b*2, as the case may be, for receiving therefrom the data modulated tire condition signals, 184*a*1 and 184*a*2, 184*b*1 or 184*b*2. And, each of the receiver circuits, 186*a*1, 186*a*2, 186*b*1 and 186*b*2, is conventionally electrically to a different micro-controller circuit 180*a*1, 181*a*2, 180*b*1 or 180*b*2, for providing thereto the resulting demodulated signal, represented by the signals 189*a*, 189*a*1, 189*b*1 or 189*b*2 as the case may be. Thus the receiver circuit 186*a*1 is connected between the receiving antenna 176*a*1 and the micro-controller circuit 180*a*1, the receiver circuit 186*a*2 is connected between the receiver antenna 176*a*2 and the micro-controller 180*a*2, the receiver circuit 186*b*1 is connected between the receiver antenna 176*b*1 and the micro-controller circuit 180*b*1, and the receiver circuit 186*b*2 is connected between the receiver antenna 176*b*2 and the micro-controller circuit 180*b*2.

Moreover, in order to promote portability of the transceiver apparatus 50 (FIG. 3) and the ramp apparatus 131, the respective receiver circuits, 186*a*1, 186*a*2, 186*b*1 and 186*b*2, are respectively removably electrically connected to the associated receiver antennas, 176*a*1, 176*a*2, 176*b*1 and 176*b*2, as by means of a conventional electrical connector EC-3. The connector EC-3 may also be utilized for removably connecting a 24 VDC power lead to the vehicle sensing apparatus 130, for energization thereof, and for removably connecting an operating lead Lop between the vehicle sensing apparatus 130 and the PC 300 hereinafter described.

Figure 6:
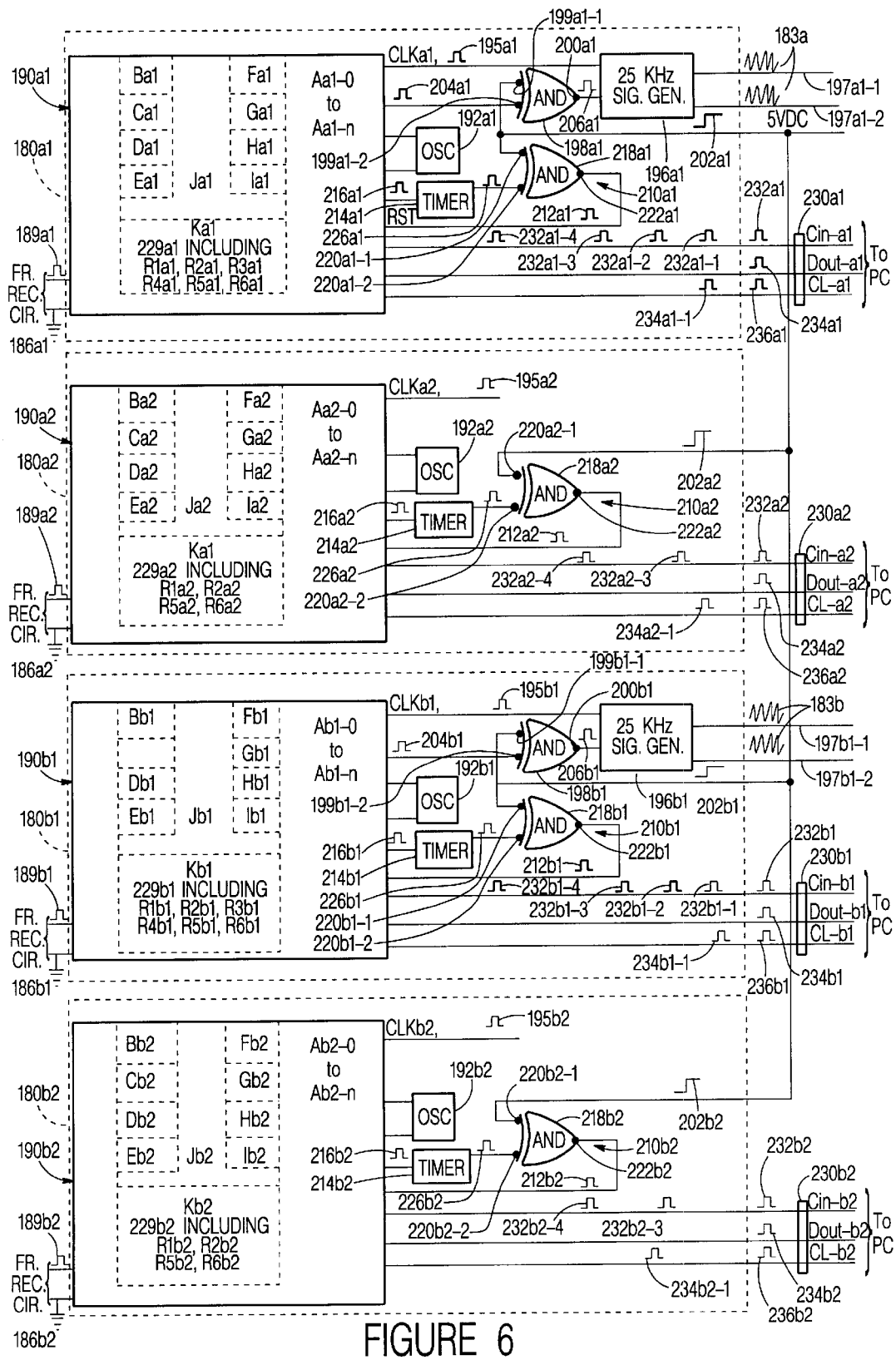
FIG. 6 is an enlarged schematic view of a portion of the transceiver apparatus FIG. 3, showing details of the microcontrollers.

Each of the micro-controller circuits, 180*a*1, 180*a*2, 180*b*1 and 180*b*2 (FIG. 6), also includes a microprocessor that may be any commercially available microprocessor, including first second third and fourth microprocessors, 190*a*1, 190*a*2 190*b*1 or 190*b*2. Each of the microprocessors, 190*a*1, 190*a*2 190*b*1 or 190*b*2, has a sufficient number of communication ports "A" that are already available or are programmable for serial, parallel or asynchronous communications, as the case may be, to provide separate external communication links for respective components of the associated micro-controller circuit, 180*a*1, 180*a*2, 180*b*1 or 180*b*2, and any components of the monitoring system 125 associated therewith.

Accordingly, the first micro-controller circuit 180*a*1 (FIG. 7) includes the first microprocessor 190*a*1, which has a first plurality of communication, ports designated Aa1-0 to Aa1-n inclusive. In addition, the second micro-controller circuit 180*a*2 includes the second microprocessor 190*a*1, which has a second plurality of communication ports designated Aa2-0 to Aa2-n inclusive. Moreover, the third micro-controller circuit 180*b*1 includes the third microprocessor 190*b*1, which has a third plurality of communication ports designated Ab1-0 to Ab1-n inclusive. And, the fourth micro-controller circuit 180*b*2 includes the fourth microprocessor 190*b*2, which has a fourth plurality of communication ports designated Ab2-0 to Ab2-n inclusive. In each instance, the number "n" as used in the respective designations of the communication ports, Aa1-n, Aa2-n, Ab1-n and Ab2-n, depends upon the choice of microprocessor, 190*a*1, 190*a*2, 190*b*1 and 190*b*2.

In addition to the ports Aa1-0 through Aa1-n, the first microprocessor 190*a*1 has a plurality of control circuits Ba1, additional program memory circuits Ca1, a plurality of working and spare register circuits Da1, an arithmetic logic circuit Ea1, one or more oscillator and clock circuits Fa1, data memory circuits Ga1, timer and event counter circuits Ha1, program expansion control circuits Ia1 an internal communications bus circuit Ja1 and a plurality of additional program memory circuits Ka1. In addition to the ports Aa2-0 through Aa2-n, the second microprocessor 190a2 has a plurality of control circuits Ba2, program memory circuits Ca2, a plurality of working and spare register circuits Da2, an arithmetic logic circuits Ea2, one or more oscillator and clock circuits Fa2, data memory circuits Ga2, timer and event counter circuits Ha2, program expansion control circuits Ia2, an internal communications bus circuit a Ja2 and a plurality of additional program memory circuits Ka2.

In addition to the ports Ab1-0 through Ab1-n, the third microprocessor 190b1 has a plurality of control circuits Bb1, program memory circuits Cb1, a plurality of working and spare register circuits Db1, an arithmetic logic circuits Eb1, one or more oscillator and clock circuits Fb1, data memory circuits Gb1, timer and event counter circuits Hb1, program expansion control circuits Ib1 an internal communications bus circuit a Jb1 and a plurality of program memory circuits Kb1.

In addition to the ports Ab1-0 through Ab2-n, the fourth microprocessor 190b2 has a plurality of control circuits Bb2, program memory circuits Cb2, a plurality of working and spare register circuits Db2, an arithmetic logic circuits Eb2, one or more oscillator and clock circuits Fb2, data memory circuits Gb2, timer and event counter circuits Hb2, program expansion control circuits Ib2 an internal communications bus circuit a Jb2 and a plurality of additional program memory circuits Kb2.

Of course, without departing from the spirit and scope of the invention, each of the microprocessors, 190a1, 190a2 190b1 and 190b2, may include a plurality thereof to provide for any added capacities that may be called for in the course of implementation of the invention.

Moreover, the first, second, third and fourth microcontroller circuits 1801a1, 180a2, 180b1 and 180b2 (FIG. 6), respectively include first, second, third and fourth oscillator circuits 192a1, 192a2 192b1 and 194b2, that are suitably electrically connected to the associated microprocessors, 190a1, 190a2 190b1 and 190b2, for use under the control thereof for internal timing purposes and generation of respective first, second, third and fourth clock signals 195a1, 195a2 195b1 and 195b2, that are respectively impressed on the clock leads, CLKa1, CLKa2, Clkb1 and Clkb2.

Still further, the first and third micro-controller circuits, 1801a1 and 180b (FIG. 6) respectively include left and right transmitter signal generator circuits, 196a1 and 196b1, for providing separate pairs of 125 KHz input signals, 183a and 183b, on output leads 197a1-1 and 197a1-2, and 197b1-1 and 197b1-2, respectively, to the left and right transmitter antenna driver circuits, 182a and 182b. For timing purposes, the first and third signal generator circuits, 196a1 and 196b1, are each suitably electrically connected to the clock leads CLKa1 and CLKb1, respectively, of the associated microprocessor, 190a1 and 190b1, for receiving therefrom the clock signal, 195a1 or 195b1, as the case may be.

In addition, the first micro-controller circuit 180a1 (FIG. 6) includes a first conventional AND gate 198a1, having first and second input terminals, 199a1-1 and 199a1-2, and an output terminal 200a1. The first input terminal 199a1-1 is conventionally electrically connected to the power supply 500 hereinafter described for receiving therefrom a 5 VDC signal, represented by the signal 202a1. The second input terminal 199a1-2 is conventionally electrically connected to the first microprocessor 190a1 for receiving therefrom a gate-operating signal, represented by the signal 204a1. And, the output terminal 200a1 is conventionally electrically connected to the first transmitter signal generator circuit 196a1 for providing thereto an enabling signal, represented by the signal 206a1. Correspondingly, the third microcontroller circuit 180b1 includes a first conventional AND gate 198b1, having first and second input terminals, 199b1-1 and 199b1-2, and an output terminal 200b1. The first input terminal 199b-1 is conventionally electrically connected to the power supply 500 hereinafter described for receiving therefrom a 5VDC signal, represented by the signal 202b1. The second input terminal 199b1-2 is conventionally electrically connected to the first microprocessor 190b1 for receiving therefrom a gate-operating signal, represented by the signal 204b1. And, the output terminal 200b1 is conventionally electrically connected to the second signal generator circuit 196b1 for providing thereto an enabling signal, represented by the signal 206b1.

Further, the first, second third and fourth micro-controller circuits, 1801a1, 180a2, 180b1 and 180b2 (FIG. 6), respectively, include first, second, third and fourth timing structures, 210a1, 210a2, 210b1 and 210b2, externally of the associated microprocessors 190a1, 190a2, 190b1 and 190b2, that are constructed and arranged for respectively providing a count of a predetermined time interval from initialization of the respectively associated microprocessors, 190a1, 190a2, 190b1 and 190b2 and for respectively providing a reset signal, 212a1, 212a2, 212b1 or 212b2, as the case may be, to the respective microprocessors, 190a1, 180a2, 190b1 and 190b2 at the end of the predetermined time interval. Preferably, the time interval corresponds to a selected normal time period for interrogation of all of the tire tags 10 of a typical vehicle 128 having a maximum number of tires 100a1, 100a2, 100b1 and 100b1. Preferably, the first, second, third and fourth timing structures, 210a1, 210a2, 210b1 and 210b, respectively, include first, second, third and fourth timer circuits, 214a1, 214a2, 214b1 or 214b2, as the case may be, that are respectively conventionally electrically connected to the associated microprocessors, 190a1, 190a2, 190b1 and 190b2, for receiving therefrom an enabling signal, 216a1 216a2, 216b1 or 216b2, as the case may be.

The first timing structure 210a1 (FIG. 6) preferably includes a second conventional AND gate 218a1, having first and second input terminals, 220a1-1 and 220a2, and an output terminal 222a1. The first input terminal 220a1-1 is conventionally electrically connected to the power supply 500 hereinafter described for receiving therefrom a 5 VDC signal, represented by the signal 202a1. The second input terminal 220a1-2 is conventionally electrically connected the first timer circuit 214a1 for receiving therefrom a gate operating signal, represented by the signal 226a1. And, the output terminal 222a1 is conventionally electrically connected to the first microprocessor 190a1 for providing thereto the reset 212a1.

The second timing structure 210a2 (FIG. 6) preferably includes a second conventional AND gate 218a2, having first and second input terminals, 220a2-1 and 220a2-2, and an output terminal 222a2. The first input terminal 220a2-1 is conventionally electrically connected to the power supply 500 hereinafter described for receiving therefrom a 5VDC signal, represented by the signal 202a2. The second input terminal 220a2-2 is conventionally electrically connected the second timer circuit 214a2 for receiving therefrom a gate operating signal, represented by the signal 226a2. And, the output terminal 222a2 is conventionally electrically connected to the second microprocessor 190a2 for providing thereto the reset signal 212a2.

The third timing structure 210b1 (FIG. 6) preferably includes a second conventional AND gate 218b1, having first and second input terminals, 220b1-1 and 220b1-2, and an output terminal 222b1. The first input terminal 220b1-1 is conventionally electrically connected to the power supply 500 hereinafter described for receiving therefrom a 5 VDC signal, represented by the signal 202b1. The second input terminal 220b1-2 is conventionally electrically connected the third timer circuit 214b1 for receiving therefrom a gate operating signal, represented by the signal 226b1. And, the output terminal 222b1 is conventionally electrically connected to the third microprocessor 190b1 for providing thereto the reset 212b1.

The fourth timing structure 210b2 (FIG. 6) preferably includes a second conventional AND gate 218b1, having first and second input terminals, 220b2-1 and 220b2-2, and an output terminal 222b2. The first input terminal 220b2-1 is conventionally electrically connected to the power supply 500 hereinafter described for receiving therefrom a 5 VDC signal, represented by the signal 202b2. The second input terminal 220b2-2 is conventionally electrically connected the fourth timer circuit 214b2 for receiving therefrom a gate operating signal, represented by the signal 226b2. And, the output terminal 222b2 is conventionally electrically connected to the fourth microprocessor 190b2 for providing thereto the reset signal 212b2.

In addition, the first, second third and fourth microcontroller circuits respectively include first, second third and fourth serial parallel or asynchronous communication links, represented by the serial communication links 230a1, 230a2, 230b1 or 230b2, as the case may be.

The first communication link 230a1 (FIG. 6) includes a first signal input lead Cin-a1 for receiving input signals, exemplified by the signal 232a1, from the PC 300 a first output lead Dout-a1 for sending output signals, exemplified by the signal 234a1, to the portable PC 300 and a first clock lead CL-a1 for receiving a clock signal, represented by the signal 236a1, from the portable PC 300.

The second communication link 230a2 (FIG. 6) includes a second signal input lead Cin-a2 for receiving input signals, exemplified by the signal 232a2, from the PC 300. a second output lead Dout-a2 for sending output signals, exemplified by the signal 234a2, to the portable PC 300 and a second clock lead CL-a2 for receiving a clock signal, represented by the signal 236a2, from the portable PC 300.

The third communication link 230a1 (FIG. 6) includes a third signal input lead Cin-b1 for receiving input signals, exemplified by the signal 232b1, from the PC 300, a third output lead Dout-a1 for sending output signals, exemplified by the signal 234b1, to the portable PC 300 and a third clock lead CL-b1 for receiving a clock signal, represented by the signal 236b1, from the portable PC 300.

The fourth communication link 230b2 (FIG. 6) includes a fourth signal input lead Cin-b2 for receiving input signals, exemplified by the signal 232b2, from the PC 300, a fourth output lead Dout-b2 for sending output signals, exemplified by the signal 234b2, to the portable PC 300 and a fourth clock lead CL-b2 for receiving a clock signal, represented by the signal 236b2, from the portable PC 300.

According to the invention, the additional program memory circuits, Ka1, Ka2, Kb1 and Kb2 (FIG. 6) of the respective microprocessors, 190a1, 190a2, 190b1 and 190b2, have stored therein an application program, 229a1, 229a2, 229b1 or 229b2, as the case may be, that is conventionally constructed and arranged for implementation by the associated microprocessor, 190a1, 190a2, 190b1 or 190b2, as the case may be, for operation of the associated microcontroller circuits, 180a1, 180a2, 180b1 or 180b2, as the case may be, under the control of the PC 300.

Each of the application programs, 229a1, 229a2, 229b1 and 229b2 (FIG. 6) preferably includes a routine, R1a1, R1a2, R1b1 or R1b2, as the case may be, for initializing the microprocessor, 190a1, 190a2, 190b1 or 190b2, as the case may be, upon receiving an enabling signal, represented by the signal, 232a1, 232a2, 232b1 or 232b2, as the case may be, from the PC 300.

In addition, each of the application programs, 229a1, 229a2, 229b1 and 229b2, each include a routine, R2a1, R2a2 R2b1 or R2b2, as the case may be, for respectively causing the timing structures, 210a1 210a2, 210b1 and 210b2, thereof to respectively commence a count of a predetermined time interval, corresponding to a selected normal time period for interrogation of all of the tire tags 10 of a typical vehicle 128 having a maximum number of tires 100a1, 100a2, 100b1 and 100b1, upon receiving from the PC-300 the respective enabling signals 232a1, 232a2, 232b1 and 232b2. Moreover, each of the a routines, R2a1, R2a2, R2b1 or R2b2, as the case may be, is constructed and arranged for causing the timing structures, 210a1, 210a2, 210b1 and 210b2, to continue timing, until the earlier of either the timing structure, 210a1, 210a2, 210b1 or 210b2, as the case may be, providing a reset signal, 212a1, 212a2, 212b1 or 212b2, to the associated microprocessor, 190a1, 190a2, 190b1 or 190b2, causing the shut-down thereof, or, the PC300 providing a shut down signal 234a1-1, 234a2-1, 234b1-1 or 234b2-1, as the case may be, to the respective micro-controller circuits 180a1, 180a1, 180b1 and 180b2, as the case may be, for causing the microprocessors, 190a1, 190a2, 190b1 and 190b2, thereof to shut down. Further, the respective routines R2a1, R2a2, R2b1 and R2b2, are constructed and arranged for causing an alert signal, represented by the signal, 234a1, 234a2, 234a2 or 234a2, as the case may be, to be provided to the PC 300, for alerting the PC 300 that the timing structure, 210a1, 210a2, 210b1 or 210b2, as the case may be, has been reset, when the respective timing structures 210a1, 210a2, 210b1 or 210b2, as the case may be, provide a reset signal, to the associated microprocessor, 190a1 190a2, 190a1 or 190b1.

Further, the application programs, 229a1 (FIG. 6), includes a routine R3a1 for causing the associated microprocessor 190a1 to commence energizing the associated signal generator circuit 196a1 for energizing the associated transmitter antenna 175a for operation thereof, upon receiving from the PC 300 a start interrogation signal, represented by the signal 232a1-1. And, the application programs, 229b1 includes a routine R3b1 for causing the associated microprocessor 190b1to commence energizing the associated signal generator circuit 196b1 for energizing the associated transmitter antenna 17b for operation thereof, upon receiving from the PC 300 a start interrogation signal, represented by the. signal 232b1-1.

Moreover, the application programs, 229a1 (FIG. 6), includes a routine R4a1 for causing the associated microprocessor 190a1 to de-energize the associated signal generator circuit 196a1 for de-energizing the associated transmitter antenna 175a for discontinuing operation thereof, upon receiving from the PC 300 a stop interrogation signal, represented by the signal 232a1-2. And, the application program, 229b1 includes a routine R4b1 for causing the associated microprocessor 190b1 to de-energize the associated signal generator circuit 196b1 for de-energizing the associated transmitter antenna 17b for discontinuing operation thereof, upon receiving from the PC 300 an interrogation signal 232b1-2.

Furthermore, each of the application programs, 229a1, 229a2, 229b1 and 229b2 (FIG. 7) includes a routine, R5a1, R5a2, R5b1 or R6b2, as the case may be, for digitizing the phase demodulated tire tag signals, 189a1, 189a2, 189b1 and 189b2, received from the respectively associated receiver circuits, 186a1, 186a2, 186b1 or 186b2, as the case may be, and for providing digital tire tag data signals, represented 234a2-2, 234b1-1 and 234b2-1 respectively, to the PC 300.

Still further, the application programs, 229a1, 229a2, 229b1 and 229b2 (FIG. 6), each include a conventional shutdown routine, R6a1, R7a2, R7b1 or R6b2, as the case may be, for turning off operation of the respective microprocessors, 190a1, 190a2, 190b1 and 190b2, upon the earlier of the timing structure, 210a1, 210a2, 210b1 or 210b2, as the case may be, providing thereto a reset signal, 212a1, 212a2, 212b1 or 212b2, or, upon the associated micro-controller, 180a1 180a2, 180b1 or 180b2, receiving a shut down signal, represented by the signal, 232a1-2, 232a2-2, 232b1-2 or 232b2-2, as the case may be, from the PC 300 for shutting down operation of the associated microprocessor, 190a1, 190a2, 190b1 or 190b2.

The monitoring system 125 (FIG. 3) also generally includes portable computer apparatus 290 for the control thereof. The portable computer apparatus 290 is conventionally removably electrically connected to the vehicle sensing apparatus 130 and to the tire sensing apparatus 136, as by means of the electrical connector EC-3. In addition, the portable computer apparatus 290 is preferably removably electrically connected, as by means of a conventional electrical connector EC-4, to the transceiver apparatus 50 for the control thereof. Moreover, the monitoring system 125 optionally includes conventional ambient temperature measuring apparatus 292, represented an electronic thermometer 294, that is conventionally electrically connected to the portable computer apparatus 290 for measuring the current ambient temperature Te and providing thereto a signal Tes representative thereof. And, the monitoring system 125 also optionally includes conventional ambient pressure measuring apparatus 296, represented by an electronic barometer 296, that is conventionally electrically connected to the portable computer apparatus 290 for measuring the current ambient pressure Pr and providing thereto a signal Prs representative thereof, The computer apparatus 290 preferably comprises a portable personal computer PC 300, such as a lap-top computer that is conventionally adapted to be connected, as by means of a conventional power line 302, to a local source of supply 303 of alternating current (AC) having a voltage level (V) of substantially 120 VAC. Although the PC 300 is preferably a laptop computer, it is within the spirit and scope of the invention to use any commercially available, portable, computer, including but not limited to a battery operated, hand held computer. The PC 300 generally includes a microprocessor 304, and includes display structure 306 and a keyboard 308 that are respectively conventionally electrically connected to the microprocessor 304 for operation under the control thereof.

Figure 7:
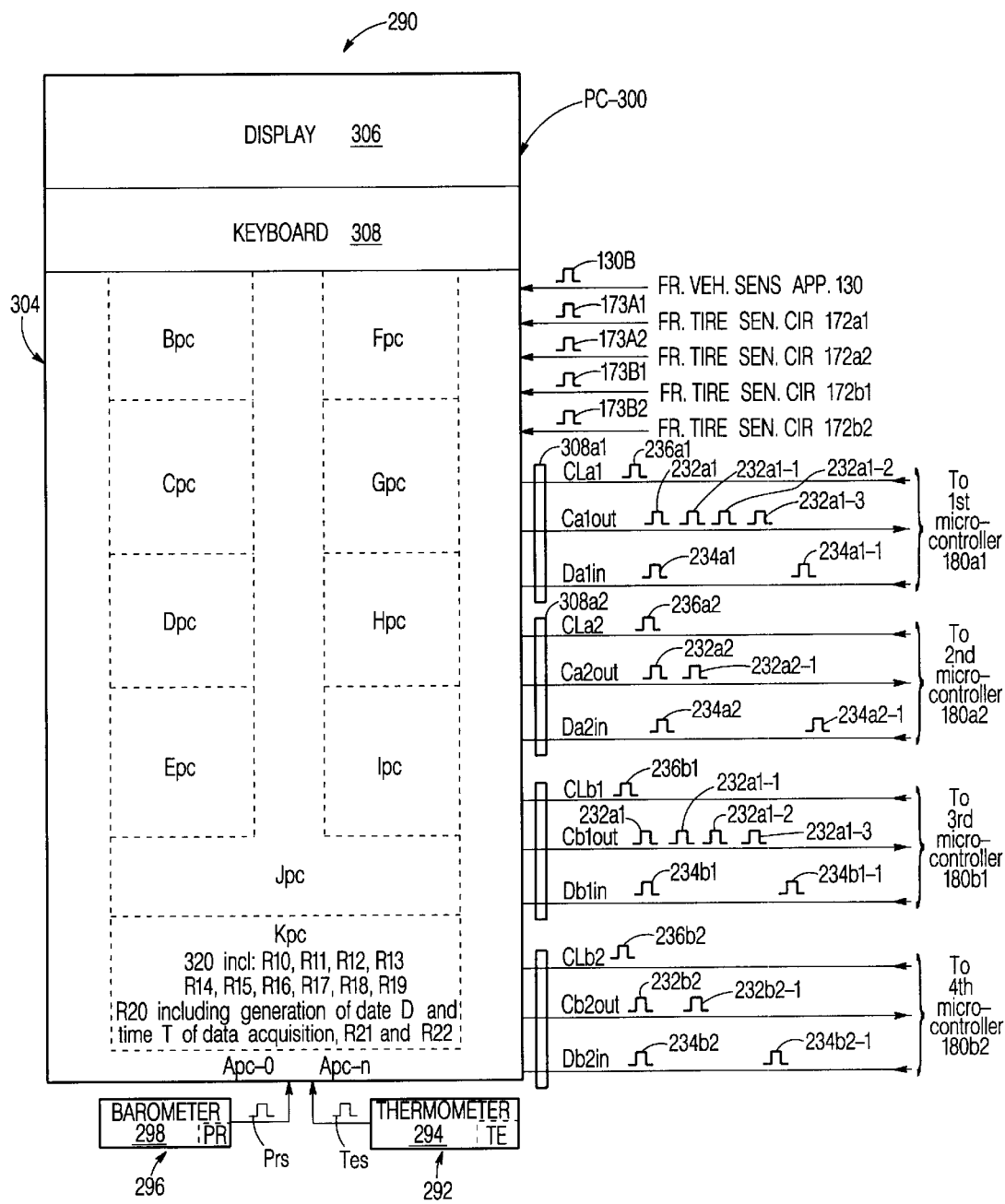
FIG. 7 is an enlarged schematic view of the portable computer apparatus of FIG. 3.

As shown in greater detail in FIG. 7, the microprocessor 304 of may be any commercially available microprocessor having a sufficient number of communications ports, "A" that are either already available or are programmable for serial, parallel or asynchronous communications, as the case may be, to provide separate external communications links for the apparatus of the monitoring system 125 and respective components thereof. Thus the microprocessor 304 includes the communication ports Apc-0 to Apc-n inclusive, where the numeral "n" depends upon the choice of microprocessor 304.

In addition, to the ports "A" the microprocessor 304 generally includes a plurality of control circuits Bpc, program memory circuits Cpc, a plurality of working and spare register circuits Dpc, arithmetic logic circuits Epc one or more oscillator and clock circuits Fpc, data memory circuits Gpc, timer and event counter circuits Hpc, program expansion control circuits Ipc, an internal communications bus circuit Jpc and additional program memory circuits Kpc.

Of course, without departing from the spirit and scope of the invention, the microprocessor 304, may include a plurality thereof to provide for any added capacities that may be called for in the course of implementation of the invention The communication ports, Apc-0 through Apc-n, (FIG. 7) include those for connection to the vehicle sensing apparatus 130, for receiving a signal, represented by the signal 130B, therefrom that is indicative of the presence of a vehicle 128 to the ramp apparatus it being noted that the receiving the signal 130 is indicative of the approach of the moving vehicle 128 to the ramp structure 131 and discontinuance of the signal 130 is indicative of the departure therefrom. In addition, communication ports, Apc-0 through Apc-n, include those for connection to the external thermometer 294, for receiving therefrom signals Tes that are representative of the current ambient temperature Te. Moreover, communication ports, Apc-0 through Apc-n, include those for connection to the external barometer 298, for receiving therefrom signals Prs that are representative of the current ambient pressure Pr. Further, the communication ports, Apc-0 through Apc-n, include those for connection to the respective tire pressure sensor structures, 172a1, 172a2, 172b1 and 172b2, for receiving therefrom signals, 173A1, 173A2, 173B1 or 173B2, as the case may be, that respectively indicate that a vehicle tire 100a1, 100a2, 100b1 or 100b2, as the case may be has been detected. And the communication ports, Apc-0 through Apc-n, include those for conventionally electrically connecting the microprocessor 304 to the respective micro-controller circuits, 180a1, 180a2, 180b1, and 180b2, by means of respectively associated serial, parallel or asynchronous communications links represented by the first, second, third and fourth serial communication links 308a1, 308a2, 308b1 and 308b2.

The first communication link 308a1 (FIG. 7) includes a first clock lead CLa1 for sending clock signals, represented by the signal 236a1, from the microprocessor 304 of the PC 300 to the first micro-controller 180a1 for synchronizing communications between the respective microprocessors, 304 and 190a1 thereof. In addition, first communication link 308a1 includes a first control signal output lead Ca1 out, for sending control signals, exemplified by the signal 232a1, from the microprocessor 304 of the PC 300 to the first micro-controller circuit 180a1 and thereby to the first microprocessor 190a1 thereof. And, the first communication link 308a1 includes a first input lead Da1 in for receiving input signals, exemplified by the signal 234a1, from the first microprocessor 190a1 and thereby from first micro-controller circuit 180a1 for use by the microprocessor 304 of the PC 300.

The second communication link 308a2 (FIG. 7) includes a second clock lead CLa2 for sending clock signals, represented by the signal 236a2, from the microprocessor 304 of the PC 300 to the second micro-controller 180a2 for synchronizing communications between the respective microprocessors, 304 and 190a2 thereof. In addition, second communication link 308a2 includes a second control signal output lead Ca2 out, for sending control signals, exemplified by the signal 232a2, from the microprocessor 304 of the PC 300 to the second micro-controller circuit 180a2 and thereby to the second microprocessor 190a2 thereof. And, the second communication link 308a2 includes a second input lead Da2in for receiving input signals, exemplified by the signal 234a2, from the second microprocessor 190a2 and thereby from second micro-controller circuit 180a2 for use by the microprocessor 304 of the PC 300.

The third communication link 308a2 (FIG. 7) includes a third clock lead CLb1 for sending clock signals, represented by the signal 236b1, from the microprocessor 304 of the PC 300 to the third micro-controller 180b1 for synchronizing communications between the respective microprocessors, 304 and 190b1 thereof. In addition, third communication link 308b1 includes a third control signal output lead Cb1out, for sending control signals, exemplified by the signal 232b1, from the microprocessor 304 of the PC 300 to the third micro-controller circuit 180a2 and thereby to the third microprocessor 190b1 thereof. And, the third communication link 308b1 includes a third input lead Db1in for receiving input signals, exemplified by the signal 234b1, from the third microprocessor 190b1 and thereby from third micro-controller circuit 180b1 for use by the microprocessor 304 of the PC 300.

The fourth communication link 308a2 (FIG. 7) includes a fourth clock lead CLb1 for sending clock signals, represented by the signal 236b2, from the microprocessor 304 of the PC 300 to the fourth micro-controller 180b2 for synchronizing communications between the respective microprocessors, 304 and 190b2 thereof. In addition, fourth communication link 308b1 includes a fourth control signal output lead Cb2out, for sending control signals, exemplified by the signal 232b2, from the microprocessor 304 of the PC 300 to the fourth micro-controller circuit 180a2 and thereby to the fourth microprocessor 190b2 thereof. And, the fourth communication link 308b2 includes a fourth input lead Db2in for receiving input signals, exemplified by the signal 234b2, from the fourth microprocessor 190b12 and thereby from fourth micro-controller circuit 180b2 for use by the microprocessor 304 of the PC 300.

According to the invention, the additional program memory circuits Kpc (FIG. 7) of the microprocessor 304 have stored therein an application program 320 that is conventionally constructed and arranged for implementation by the microprocessor 304 for controlling operation of the associated micro-controller circuits, 180a1, 180a2, 180b1 or 180b2, as the case may be, and thus the monitoring system 125.

The application program 320 includes a plurality of routines, including a routine R10 for initializing the microprocessor 304 upon receiving a signal 130B from the vehicle sensing apparatus 130.

In addition, the application program 320 includes a routine R11 for providing an enabling signals, represented by the signals, 232a1 232a2, 232b1 and 232b2, respectively, to the micro-controller circuits, 180a1, 180a2, 180b1 and 180b2, for causing the microprocessors, 190a1 190a2 190b1 and 190b2, thereof to initialize. In addition, the routine R11 is constructed and arranged for causing the timing structures 210a1, 210a2, 210b1 and 210b2, of the microprocessors, 190a1 190a2 190b1 and 190b2, to commence counting until the earlier of the timing structures, 210a1, 210a2, 210b1 and 210b2, providing a reset signals 212a1, 212a2, 212b1 or 212b2, as the case may be, to the associated microprocessors, 190a1, 190a2, 190b1 or 190b2, or the PC 300 providing respective shut down signals, represented by the signals 232a1-1, 1232a1-1, 232a2-1 or 232b1-1, thereto.

Moreover, the application program 320 (FIG. 7) includes a routine R12 for providing a start interrogation signal, 232a1-2 to the micro-controller circuit, 180a1 for causing the associated microprocessor 190a1 thereof to energize the associated signal generating circuit 196a1, resulting in energization of the associated transmitter antenna 175a, when the microprocessor 304 receives a signal, 173A1 or 173A2, as the case may be, from either of the tire pressure sensor circuits, 172a1 or 172a2, due to actuation thereof by a vehicle tire, 100a1 or 100a2.

Further, the routine R12 is also constructed and arranged for providing a start interrogation signal, 232b1-2 to the micro-controller circuit, 180b1 for causing the associated microprocessor 190b1 thereof to energize the associated signal generating circuit 196b1, resulting in energization of the associated transmitter antenna 175b, when the microprocessor 304 receives a signal, 173B1 or 173B2, as the case may be, from either of the tire pressure sensor circuits, 172b1 or 172b2, due to actuation thereof by a vehicle tire, 100b1 or 100b2.

In addition, the routine R12 is constructed and arranged for accounting for the total number of vehicle tires, 100a1, 100a2, 100b1 and 100b2, and for the configuration thereof relative to one another, thereby determining whether the respective tires, 100a1, 100a2, 100b1 and 100b2, are respectively individually or tandemly deployed for supporting the vehicle 128.

Moreover, the application program 320 includes a routine R13 for responding to the de-actuation of the tire pressure sensing circuits 172a1 172a2, 172b1 or 172b2, as the case may be to load a predetermined time interval into a counting circuit Hpc of the microprocessor 304 and to commence a countdown of a predetermined time interval, corresponding to a typical elapsed time period between the tire pressure sensing circuits, 172a1 or 172a2, 172b1 or 172b2, detecting tires 100 at a selected spacing thereof along the overall length L of a typical vehicle 128 moving over the ramp apparatus 131 at a rate of substantially 5 mph. The counting circuits Hpc thus continues counting until interruption thereof due to receiving an additional signal, 173A1 or 173A2, or 173B1 or 173B2, as the case may be from the tire pressure-sensing circuits, 172a1 or 172a2, or 172b1 or 172b2, as the case may be, or until the countdown is zero.

Assuming the aforesaid interruption of the countdown of the counting circuit Hpc, the routine R13 permits continuance of the previous actuation of the respective signal generator circuits, 196a1 and 196b1, and thus continuance of the prior energization of the associated transmitter antennas, 175a and 175b.

On the other hand, the application program 320 includes a routine R14 for providing a stop interrogation signals, represented by signals, 232a1-3 and 232b1-3, respectively, to the micro-controller circuits 180a1 and 180b1, for causing the respective microprocessors, 190a1 and 190b1, thereof to discontinue energization of the associated signal generators, 196a1 and 196a2 resulting in de-energization of the associated transmitter antennas, 175a and 175b, when the countdown of the timing circuit Hpc becomes zero.

Further, the application program 320 includes a routine R-15 for causing the microprocessor 304 to re-implement the routines R12, R13 and R14, upon subsequently receiving an additional signal 173A1 or 173A2, or 173B1 or 173B2, as the case may be, from any of the tire pressure sensing circuits, 172a1, 172a2, 172b1 or 172b2, as the case may be.

Still further, the application program 320 includes a routine R-16, for causing the microprocessor 304 to re-implement the routine R11 at any time in the course of the implementation of the foregoing routines R12 through R15 inclusive, upon receiving an alert signal 234a from any of the micro-controllers, 180a1 180a2, 180b1 or 180b2, as the case may be, prior in time to the microprocessor 304, and thus the PC 300, providing a shutdown signal, signal 232a1-1, 1232a1-1, 232a2-1 or 232b1-1, as the case may be, to the respective micro-controllers, 180a1, 180a2, 180b1 or 180b2, as the case may be.

Moreover, the application program 320 includes a routine R17 for processing the digital data signals, 234a1-1, 234a2-1, 234b1-1 and 234b2-1, received from the respective micro-controllers 180a, 180b, 180c and 180d, for obtaining therefrom data corresponding the serial numbers 36 of each of the electronic tire tags 10 and at least one of the tire condition values corresponding the air pressure or temperature values of the respective tires 100a1, 100a2, 100ab1 and 100b, the tire internal temperature thereof or the latched or unlatched state of the MTMS and thus the value thereof.

In addition, the application program 320 optionally includes a routine R18 for calculating adjusted pressure and temperature values, by taking into consideration the ambient temperature value Te and the ambient pressure value Pr, represented by the respective ambient temperature and pressure signals, Te and Pr, received by microprocessor 304, respectively from the thermometer 294 and barometer 298.

Furthermore, the application program 320 preferably includes a user routine R19 for sorting and displaying calculated pressure values to facilitate implementation of normal maintenance of the vehicle tires, 100a1, 100a2, 100b1 and 100b2.

Still further the application program 320 preferably include an optional user routine R20 for automatically generate a date D and time T of acquisition, and for automatically, or in response to conventional input from the keyboard 308, format and show on the display 306, one or more or all of the data corresponding to the serial number 36 of each electronic tire tag 10, the date D and time T of data acquisition, the actual tire pressure and temperature values, the actual internal tire temperature and the MTMS status bit B for each tire, 100a1, 100a2, 100b1 and 100b2, and the temperature and pressure values thereof as calculated in consideration of the ambient temperature and pressure values, Te and Pr.

Furthermore, the application program 320 preferably includes a routine R21 for formatting and storing the whole or any part the aforesaid of the respective tire tag serial number 36, data, calculated values, MTMS status information, and date and time, D and T, of data acquisition for information for historical record keeping purposes.

And, the application program 320 includes a conventional shutdown routine R22 for providing the respective shutdown signals, 232a1-1, 232a2-1, 232b1-1 and 232b2-1, to the respective micro-controllers 180a1, 180a2, 180b1 and 180b2, resulting in discontinuance of operation of the respective microprocessors 190a1, 190a2, 190b1 and 190b2, upon detecting that the signal 130B from the vehicle sensing apparatus 130 is no longer being received.

The monitoring system 125 (FIG. 3) also preferably includes portable power supply apparatus 500, that is adapted to be connected, as by means of a conventional power cord 502, to a local power source 503 of alternating current (AC) power having a voltage level V of substantially of 120 volts. The power supply apparatus 500 is preferably removably electrically connected to the vehicle approach sensing apparatus 130 and the transceiver apparatus 50, as by means of a conventional electrical connector EC-5. Moreover, the portable power supply preferably includes a conventional 125 VAC circuit 504 having a convenience outlet 505 that is conventionally configured for removably receiving the power line 303 of the portable computer apparatus 290.

In addition, the power supply 500 (FIG. 3) preferably includes a 24V direct current (DC) outlet terminal 506 that is adapted to be removably electrically connected, as by means of the electrical connector EC-5 to the first and second transmitter antenna drive circuits, 180a and 180b. In addition, the 24 VDC outlet terminal 506 is conventionally adapted to be removably electrically connected to the vehicle approach sensing apparatus 130, as by means of the electrical connector EC-3. Further, the power supply 500 preferably includes a 12 VDC outlet terminal 508 that is adapted to be removably electrically connected to the respective receiver circuits 186a, 186b, 186c and 186d, as by means of the electrical connector EC-3. And, the power supply 500 preferably includes a 5 VDC outlet terminal 510 that is conventionally adapted to be removably electrically connected to the respective micro-controller circuits 180a, 180b, 180c and 180d, as by means of the electrical connector EC-4.

Figure 8:
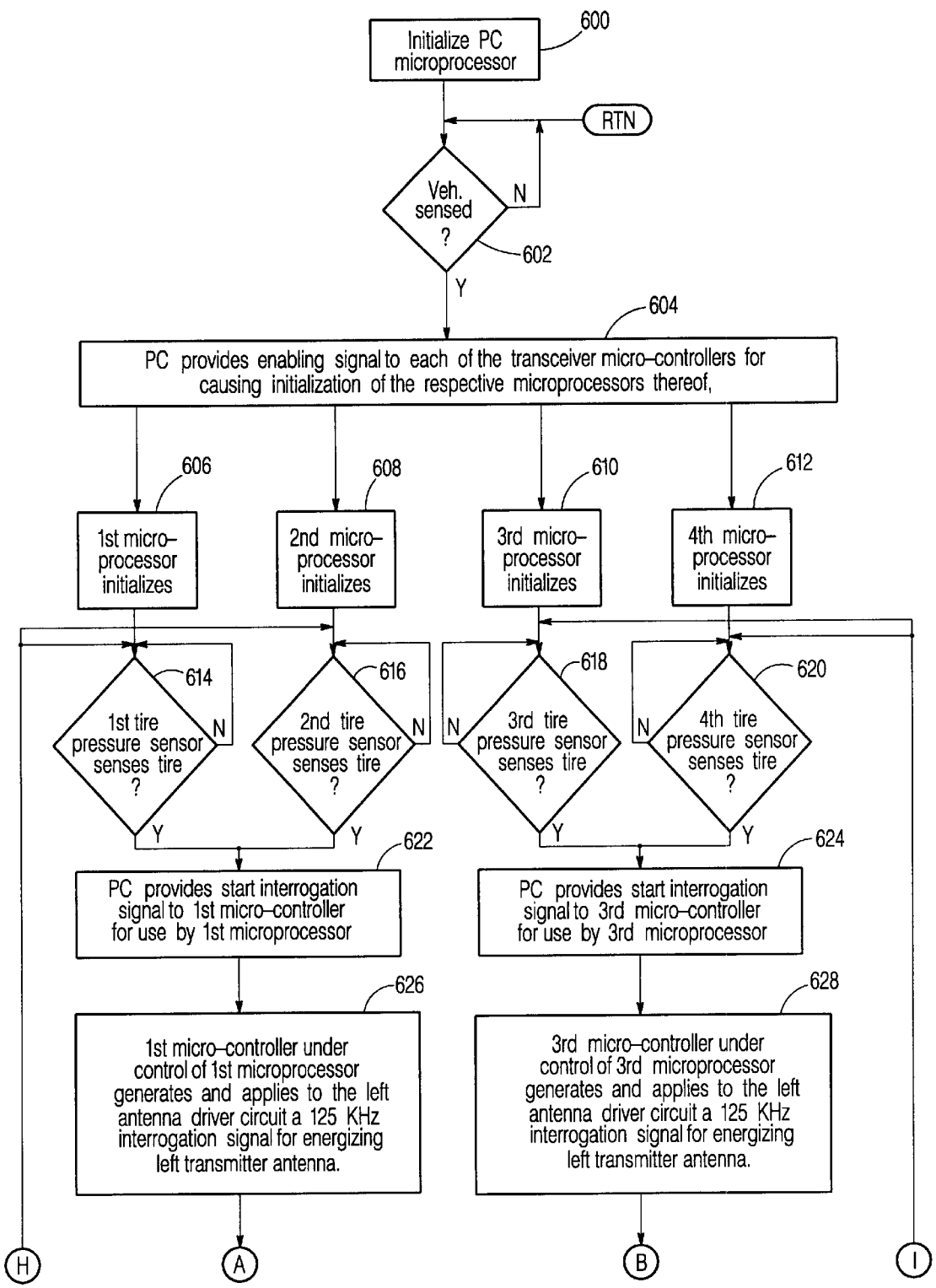
FIG. 8 is a flow chart of the commencement of a process implemented by the monitoring system according to the invention.

Assuming assembly of the monitoring system 125 (FIG. 3) and energization thereof and thus of the portable of computer apparatus 290, the PC 300 is energized and the computer program 320 (FIG. 7), stored in the microprocessor 304 thereof, initially causes the microprocessor 304 to implement the step 600 (FIG. 8) of initializing the microprocessor 304. Thereafter, the computer program 320 implements the step 602 of determining whether a vehicle 128 has been sensed by the vehicle sensing apparatus 130. Assuming a vehicle 128 has not been sensed, step 602, the computer program 320 causes processing to continuously loop through step 602 until a vehicle 128 is sensed, step 602. Whereupon the computer program 320 implements the step 604 of providing an enabling signal, 232a1, 232a2, 232b1 or 232b2, as the case may be, to each of the transceiver micro-controllers, 180a1, 180a2, 180b1 and 180b2, respectively for causing the initialization of the respective first, second, third and fourth microprocessors, 190a1, 190a2 190b1 and 190b2, thereof, steps 606, 608, 610 and 612, respectively.

Thereafter, the computer program 320 (FIG. 7) causes the microprocessor 304 of the PC 300 to implement the respective steps 614, 616, 618 and 620 (FIG. 8) of determining whether any one or more of the first, second, third and fourth tire pressure sensing structures 170 (FIG. 3) has sensed a vehicle tire, 100a1, 100a2 100b1 or 100b2, as the case may be. Assuming that all of the inquiries of steps, 612, 614, 616 and 618 (FIG. 8) are negatively answered, then, the computer program 320 causes processing to continuously loop through steps 614, 616, 618 and 620, respectively, until any one or more of the inquiries thereof is affirmatively answered. Assuming the inquiry of any one or more of steps 614 and 616 is affirmatively answered, as evidenced by the microprocessor 304 (FIG. 7) of the P 300 receiving a sensing signal, 173A1 or 173A2, or both as the case may be, from any one or more of the left tire sensing structures, 172a1 and 172a2, as the case may be then, the computer program 320 implements the step 622 (FIG. 8) of providing a start interrogation signal 232a1 to the first micro-controller 180a1 for use by the first microprocessor 192a1. On the other hand, assuming the inquiry of any one or more of steps 618 and 620 is affirmatively answered, as evidenced by the microprocessor 304 (FIG. 7) of the PC 300 (FIG. 3) receiving a sensing signal, 173B1 or 173B2, or both, as the case may be, from any one or more of the right tire sensing structures, 172*b*1 and 172*b*2, as the case may be then, the computer program 320 implements the step 624 (FIG. 8) of providing a start interrogation signal 232*b*1 to the third micro-controller 180*b*1 for use by the third microprocessor 192*b*1. Assuming that a start interrogation signal 232*a*1, step 622, is provided to the first micro-controller 180*a*1, the first microprocessor 192*a*1 implements the step 626 of causing the first micro-controller 180*a* (FIG. 3) to generate and apply a pair of 125 KHz interrogation signals 183*a* to the left antenna driver circuit 182*a* for causing the associated left antenna 175*a* to transmit an interrogation signal 46 to the respective tire tags 10 incorporated in the left, outer and inner tires, 100*a*1 and 100*a*2, of the moving vehicle 128. On the other hand, assuming that a start interrogation signal 232*b*1, step 624 (FIG. 8) is provided to the third micro-controller 180*a*1, the third microprocessor 192*b*1 implements the step 628 of causing the third micro-controller 180*b*1 (FIG. 3) to generate and apply a pair of 125 KHz interrogation signals 183*b* to the right antenna driver circuit 182*b* for causing the associated right antenna 175*b* to transmit an interrogation signal 46 to the respective tire tags 10 incorporated in the right, inner and outer tires, 100*b*1 and 100*b*2, of the moving vehicle 128.

Figure 9:
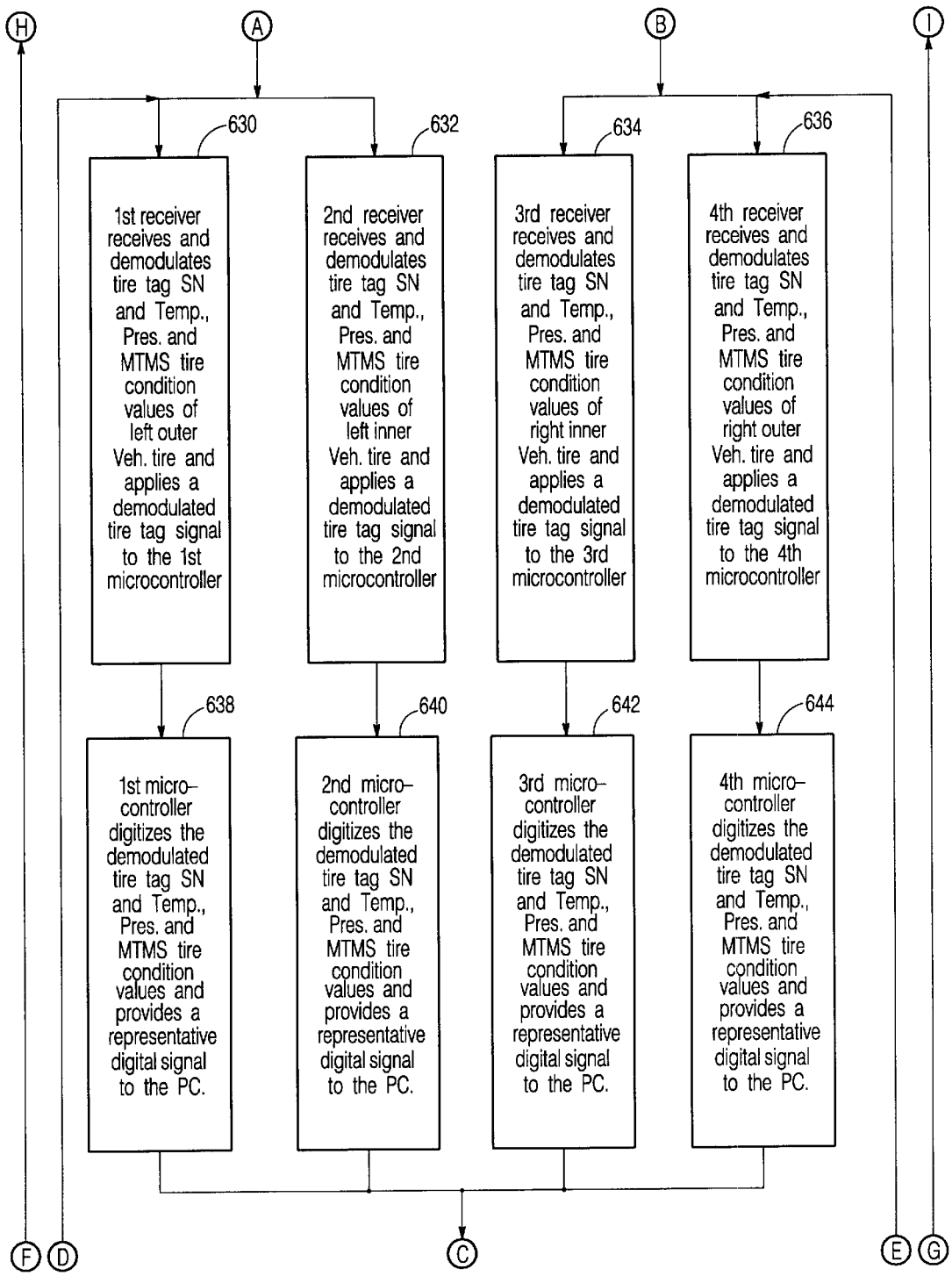
FIG. 9 is a continuation of the flow chart of FIG. 8.

Thereafter, as shown in steps 630 and 632 (FIG. 9) respectively, one or more of the first and second transceiver receiver circuits; 186*a*1 and 186*a*2 (FIG. 3) automatically receives and demodulates one or more of the tire tag signals, 184*a*1 and 184*a*2, respectively from one or more of the left receiver antennas, 176*a*1 and 176*a*2, and applies the demodulated signals. 189*a*1 and 189*a*2, to the first and second micro-controllers, 180*a*1 or 180*a*2, or both, as the case may be. And, as shown in steps 634 and 636 (FIG. 9) respectively, one or more of the third and fourth transceiver receiver circuits, 186*a*1 and 186*a*2 (FIG. 3) automatically receives and demodulates one or more of the tire tag signals, 184*b*1 and 184*b*2, respectively from one or more of the left receiver antennas 176*b*1 and 176*b*2 and applies the demodulated signal, 189*b*1 and 189*b*2, respectively to the first and second micro-controllers 180*a*1 or 180*a*2, as the case may be. Upon receiving a demodulated signal, 189*a*1, 189*a*2, 189*b*1 or 189*b*2, as the case may be, the first, second, third and fourth microprocessor, 180*a*1, 1980*a*2, 180*b*1 or 180*b*2, as the case may be, respectively implement the steps 638, 640, 642 or 644 (FIG. 9), as the case may be, of causing the demodulated signal 189*a*1, 189*a*2, 189*b*1 or 189*b*2, received thereby to be digitized and providing to the PC 300 respective corresponding digital tire tag data signals, 234*a*1-1, 234*a*2-1, 234*b*1-1 or 234*b*2-1, as the case may be.

Figure 10:
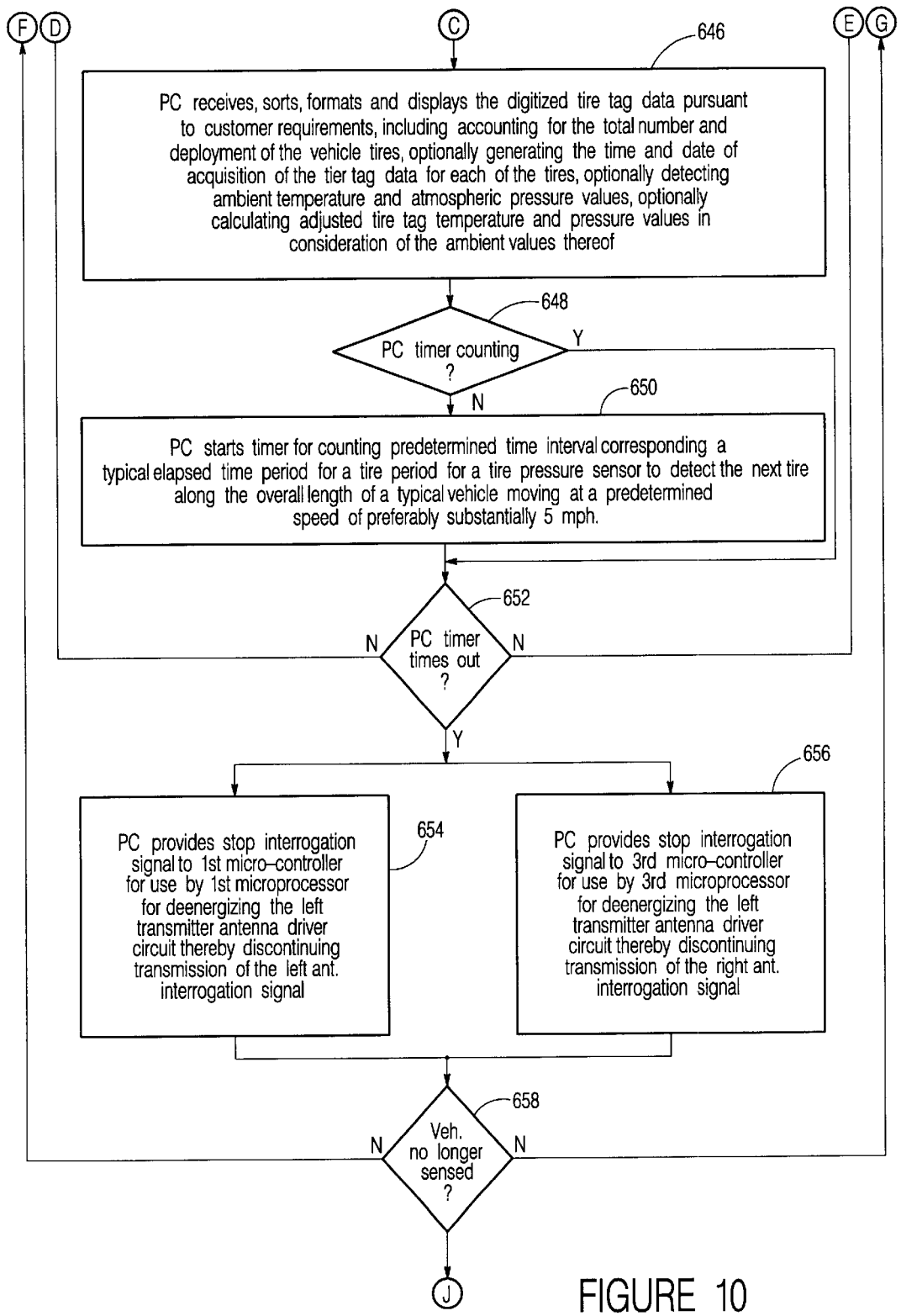
FIG. 10 is a continuance of the flow chart of FIG. 9 and thus a further continuation of the flow chart of FIG. 8.

Thereafter the computer program 320 (FIG. 7) implements the step 646 (FIG. 10) of processing each of the digital data signals 234*a*1-1, 234*a*2-1, 234*b*1-1 and 234*b*2-1, for obtaining therefrom data corresponding to the serial number SN of each of the tire tags 10 and at least one tire condition value provided by each of the tire tags 10. Preferably, each of the at least one tire condition values is a value selected from a group consisting of a tire air pressure value, a tire air temperature value, an internal tire temperature value and an MTMS status bit. In the course of implementing step 646, the computer program 320 implements the respective steps of sorting, formatting and displaying the digitized tire tag data pursuant to customer requirements, including accounting for the total number and deployment of the vehicle tires, 100*a*1, 100*a*2, 100*b*1 and 100*b*2, optionally generating the time T and date D of acquiring the tire tag data for each of the vehicle tires, 100*a*1, 100*a*2, 100*b*1 and 100*b*2, optionally detecting ambient temperature and atmospheric pressure values, Te and Pr, and optionally calculating adjusted tire tag temperature and pressure values in consideration of the ambient values, Te and Pr, thereof.

The computer program 320 (FIG. 7) then implements the step 648 (FIG. 10) of determining whether a PC timer circuit Hpc is currently counting a predetermined time interval as hereinafter discussed. Assuming that the inquiry of step 648 is negatively answered, then, the computer program 320 implements the step 650 of loading the predetermined count into a timing circuit Hpc of the microprocessor 304 and commencing a count down thereof. Preferably, the predetermined count corresponds to a typical maximum elapsed time period for a tire pressure sensor, 172*a*1, 172*a*2, 172*b*1 or 172*b*2, as the case may be, to detect the next tire, 100*a*1, 100*a*22, 100*b*1 or 100*b*2, as the case may be, along the overall length L of a typical vehicle 128 moving at a predetermined speed of preferably substantially 5 mph. Thereafter, the computer program 320, implements the step 652 of determining whether the timing circuit Hpc has timed out. Referring back to step 648, it is noted that assuming the inquiry of step 648 is positive, then, the computer program 320 directly implements step 652, due step 650 having been previously implemented. Assuming the inquiry of step 652 is negatively answered, indicating that the timing circuit Hpc has not timed out, the computer program 320 assumes that the vehicle 128 has additional tires 100*a*1, 100*a*22, 100*b*1 and 100*b*2. Accordingly, the computer program 320 causes processing to be looped through steps 630 through 644 inclusive of FIG. 9 and through steps 646 through 652 inclusive of FIG. 10, until the inquiry of step 652 is affirmatively answered. Thus the computer program 320 permits the continuance of steps 626 and 628 of FIG. 8, wherein the first and third micro-controllers, 180*a*1 and 180*b*1, are causing interrogation signals 46 to be transmitted from the respective left and right transmitter antennas 175*a* and 175*b*. When the inquiry of step 652 (FIG. 10) is affirmatively answered, the computer program 320 assumes that there are no additional tires, 100*a*1, 100*a*2, 100*b*1 and 100*b*2, then available for monitoring, and, in order to conserve energy, the computer program 320 implements the respective steps 654 and 656, of providing stop interrogation signals, 232*a*1-2 and 232*b*1-2, respectively to the first and third micro-controllers, 180*a*1 and 180*b*1, for use by the respective microprocessors, 190*a*1 and 190*b*1, thereof. Whereupon the respective first and third microprocessors, 190*a*1 and 190*b*1, implement the steps of de-energizing the respective left and right antenna driver circuits, 180*a* and 180*b*, for discontinuing transmission of interrogation signals 46 to the respective tire tags 10.

Figure 11:
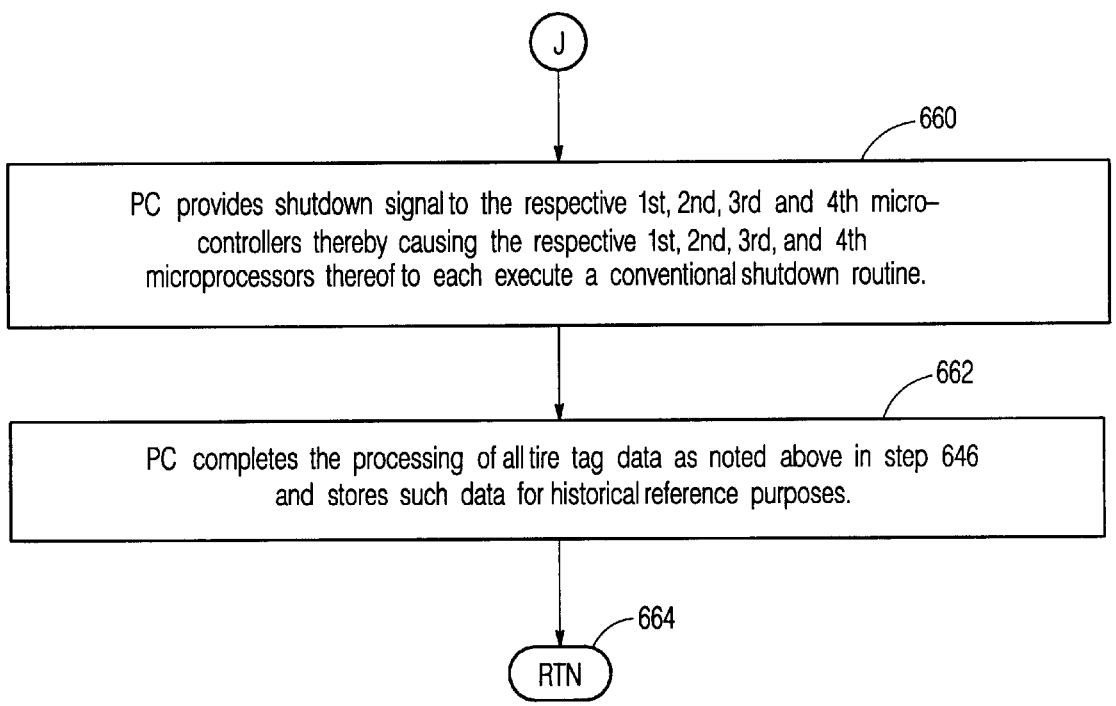
FIG. 11 is a continuation and end of the flow chart of FIG. 10, and thus a still further continuance and end of the flow chart of FIG. 8.

Thereafter, the computer program 320 (FIG. 3) implements the step 658 (FIG. 10) of inquiring whether the vehicle 128 is no longer being sensed by the vehicle sensing apparatus 130. Assuming that the inquiry of step 658 is negatively answered, indicating that the vehicle 128 is still being sensed, the computer program 320 assumes the vehicle 128 includes additional tires, 100*a*1, 100*a*2, 100*b*1 and 100*b*2, and, therefor, returns processing to steps 614, 616, 618 and 620 to await further actuation of the tire pressure sensing structures 170. On the other hand, assuming the inquiry of step 658 (FIG. 10) is affirmatively answered, the computer program 320 implements the step 660 (FIG. 11) of providing respective shut down signals, 232*a*1-1, 232*a*2-1, 232*b*1-1 and 232*b*2-1, respectively to each of the first, second, third and fourth micro controllers, 189*a*1, 180*a*2, 180*b*1 and 180*b*2, for causing the respective microprocessors, 190*a*1, 190*a*2, 190*b*1 and 190*b*2, thereof to each execute a conventional shutdown routine. Thereafter, the computer program 320 implements the step 662 of completing the processing of data, in accordance with step 646 (FIG. 10) and storing such data, step 652 (FIG. 11) for historical reference purposes. Thereafter the computer program 320 implements the step 664 of returning processing to step 602 to await sensing another vehicle 128.

Although the preferred embodiments of the invention have hereinabove been shown and described in detail, such embodiments should be considered to be illustrative and not restrictive in character. In this connection it is noted that numerous variations of the preferred embodiments of the invention may become apparent to persons skilled in the art as a result or having seen the foregoing drawings and read and understood the accompanying description appertaining to the invention, and it is intended that such variations as fall within the spirit and scope the invention shall be protected to the same extent as are the preferred embodiments of the invention.

What is claimed is:

1. A method for monitoring at least one tire condition value of each of a plurality of tires of a moving vehicle, wherein each of the tires has associated therewith an electronic tire tag for sensing the at least one tire condition value of the associated tire, the method using a monitoring system with a vehicle sensing apparatus, ramp apparatus, tire sensing apparatus, transceiver apparatus and computer apparatus removably electrically connected thereto and to the vehicle sensing apparatus and tire sensing apparatus, the method comprising the steps of:

(a) determining with the computer apparatus whether the vehicle sensing apparatus has sensed the moving vehicle;
    (b) supporting the moving vehicle on the ramp apparatus;
    (c) determining whether respective tires of the moving vehicle have been sensed by the tire sensing apparatus with the computer apparatus;
    (d) transmitting an interrogation signal with the transceiver apparatus when the tire sensing apparatus senses at least one tire;
    (e) receiving and demodulating modulated tire tag signals independently of one another from different tire tags with the transceiver apparatus for providing different demodulated tire tag signals; and
    (f) digitizing the different demodulated tire tag signals with the transceiver apparatus and providing corresponding different digital tire tag signals to the computer apparatus.

2. The method according to claim 1 including the steps of:
    providing a vehicle sensing signal to the computer apparatus when the moving vehicle is sensed with the vehicle sensing apparatus; and
    providing an enabling signal to the transceiver apparatus with the computer apparatus upon receiving the vehicle sensing signal.

3. The method according to claim 1 including the steps of:
    providing a tire sensing signal to the computer apparatus with the tire sensing apparatus upon sensing the at least one tire, and
    providing a start interrogation signal to the transceiver apparatus with the computer apparatus upon receiving the tire sensing signal.

4. The method according to claim 1, wherein the processing step includes the step of obtaining from each of the digital tire tag signals data corresponding to at least one tire condition value selected from a group consisting of a tire air pressure value, a tire air temperature value, an internal tire temperature value, and an MTMS status value.

5. The method according to claim 4, wherein the processing step further includes the steps of sorting and formatting the at least one tire condition value obtained from each of the digital tire tag signals.

6. The method according to claim 4, wherein the processing step includes the steps of sorting and displaying the at least one tire condition value obtained from each of the digital tire tag signals.

7. The method according to claim 4 including the steps of:
    obtaining current ambient temperature and pressure values from ambient pressure and temperature value measuring apparatus of the computer apparatus; and
    adjusting at least one of the values obtained from the digital tire tag signal by the computer apparatus in consideration of at least one of the current ambient temperature and pressure values.

8. The method according to claim 1, wherein each of the tire tags has a different serial number, and the processing step includes the step of obtaining from the digital tire tag signals data corresponding to the different serial numbers.

9. The method according to claim 1, wherein the processing step includes the step of accounting for a total number and deployment of the vehicle tires.

10. The method according to claim 1 including the steps of:
    determining whether the moving vehicle is no longer sensed by the vehicle sensing apparatus by the computer apparatus; and
    permitting the transceiver apparatus to continue transmitting the interrogation signal with the computer apparatus until the moving vehicle is no longer sensed.

11. The method according to claim 1, wherein the processing step includes the step of generating a date and time of receiving each of the digital tire tag signals.

12. The method according to claim 1 including the steps of:
    determining whether a previous count of a predetermined time period has been commenced with the computer apparatus, the computer apparatus commencing the count of the predetermined time period upon determining that the count has not been commenced; and
    providing a stop interrogation signal to the transceiver apparatus with the computer apparatus for causing discontinuance thereby of the interrogation signal when the count ends.

13. The method according claim 1 including the step of determining whether respective tires of the moving vehicle have been sensed by the tire sensing apparatus with the computer apparatus until the vehicle is no longer sensed.

14. The method according to claim 1 including the steps of:
    commencing a count of a predetermined time interval when the computer apparatus stops receiving the tire sensing signals; and
    causing the transceiver apparatus to continue transmission of the interrogation signal with the computer apparatus until the count ends.

15. The method according to claim 14 including the step of providing a stop interrogation signal to the transceiver apparatus with the computer apparatus for causing discontinuance of the interrogation signal when the count ends.

16. The method according to claim 1 including the steps of:
  providing a shutdown signal to the transceiver apparatus with the computer apparatus when the vehicle is no longer sensed; and
  executing a shutdown routine with the transceiver apparatus upon receiving the shutdown signal.

17. The method according to claim 16 including the step of determining whether another vehicle has been sensed after the computer apparatus provides the shutdown signal to the transceiver apparatus.

18. The method according to claim 1 including the step of storing data corresponding to the respective digital data signals for historical reference purposes.

* * * * *